US006883982B2

(12) United States Patent
Tokuda et al.

(10) Patent No.: US 6,883,982 B2
(45) Date of Patent: Apr. 26, 2005

(54) IMAGE PROCESSING SYSTEM

(75) Inventors: Shinya Tokuda, Yokohama (JP); Takashi Yamaguchi, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 10/830,124

(22) Filed: Apr. 23, 2004

(65) Prior Publication Data

US 2004/0215965 A1 Oct. 28, 2004

(30) Foreign Application Priority Data

Apr. 25, 2003 (JP) .................................... 2003-122346
Mar. 16, 2004 (JP) .................................... 2004-075020

(51) Int. Cl.[7] ............................. B41J 11/44; G06K 9/00
(52) U.S. Cl. ................................... 400/76; 382/100
(58) Field of Search ......................... 101/483; 400/76; 382/275, 233, 132, 100; 380/219

(56) References Cited

U.S. PATENT DOCUMENTS

| 5,407,893 | A | 4/1995 | Koshizuka et al. | 503/227 |
| 5,661,574 | A | 8/1997 | Kawana | 358/501 |
| 5,946,414 | A | 8/1999 | Cass et al. | 382/183 |
| 5,974,150 | A | 10/1999 | Kaish et al. | 713/179 |
| 5,995,638 | A | 11/1999 | Amidror et al. | 382/100 |
| 6,095,566 | A | 8/2000 | Yamamoto et al. | 64/392 |
| 6,438,251 | B1 | 8/2002 | Yamaguchi | 382/100 |
| 6,556,688 | B1 | 4/2003 | Ratnakar | 382/100 |
| 6,724,921 | B2 * | 4/2004 | Yamaguchi | 382/118 |
| 6,823,078 | B1 * | 11/2004 | Florent et al. | 382/132 |
| 2001/0040980 | A1 | 11/2001 | Yamaguchi | 382/100 |
| 2002/0080996 | A1 | 6/2002 | Rhoads | 382/100 |
| 2002/0118887 | A1 * | 8/2002 | Gindele | 382/260 |
| 2003/0035045 | A1 | 2/2003 | Miki | 347/213 |
| 2003/0053712 | A1 * | 3/2003 | Jansson | 382/275 |
| 2003/0152227 | A1 * | 8/2003 | Javidi | 380/219 |
| 2004/0146159 | A1 * | 7/2004 | Rosen | 380/200 |
| 2004/0150747 | A1 * | 8/2004 | Sita | 348/558 |

FOREIGN PATENT DOCUMENTS

| EP | 0 921 675 A2 * | 6/1999 | ............ H04N/1/32 |
| EP | 1 014 318 A2 | 6/2000 | |
| EP | 1 136 947 A2 | 9/2001 | |
| EP | 1 168 817 A2 | 1/2002 | |
| JP | 6-59739 | 3/1994 | |
| JP | 9-248935 | 9/1997 | |
| JP | 11-168616 | 6/1999 | |
| JP | 11-355554 | 12/1999 | |
| JP | 2001-268346 | 9/2001 | |
| JP | 2001-274971 | 10/2001 | |

OTHER PUBLICATIONS

A. K. Bhattachariya et al., "Data Embedding in Text for a Copier System," Image Processing, 1999, ICIP 99, Proceedings, pp. 245–249.
D. Delannay et al., "Generalized 2–D Cyclic Patterns for Secret Watermark Generation," ICIP 2000—IEEE Signal Processing Society International Conference on Image Processing, vol. 2, Sep. 10, 2000, pp. 77–79.

* cited by examiner

Primary Examiner—Ren Yan
Assistant Examiner—Wasseem H. Hamdan
(74) Attorney, Agent, or Firm—Pillsbury Winthrop LLP

(57) ABSTRACT

Composite image information which is generated by embedding invisible sub-information in visible main image information and recorded on a recording medium is read. A spatial frequency component unique to key information used to restore the sub-information is extracted from the composite image information read from the recording medium. The sub-information is reconstructed from the extracted spatial frequency component.

25 Claims, 15 Drawing Sheets

White pixels are removed and black pixels are packed → pixels are re-arrayed

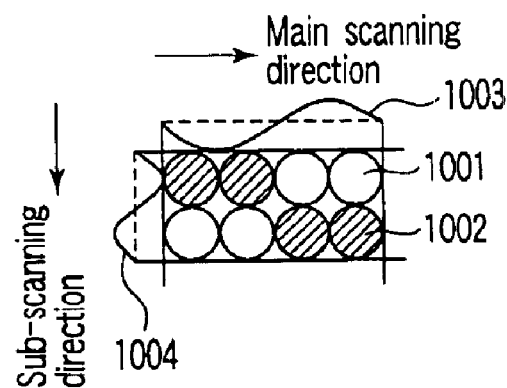
F I G. 10A
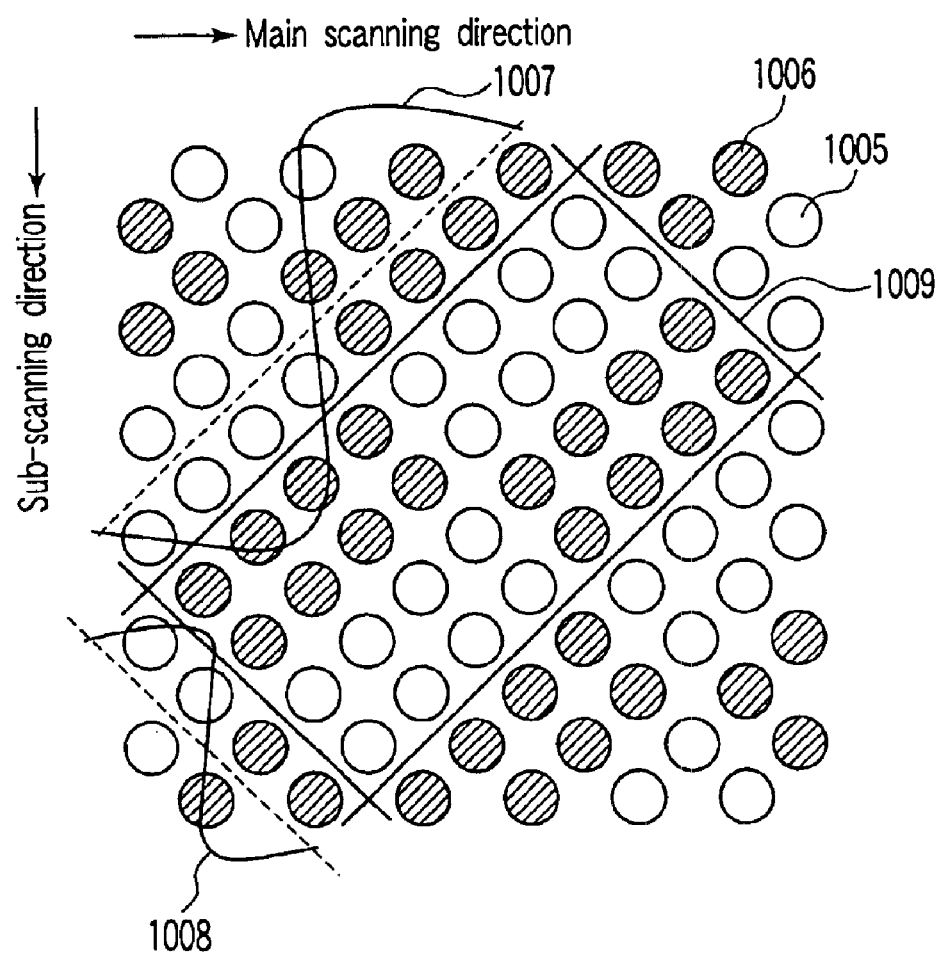
F I G. 10B

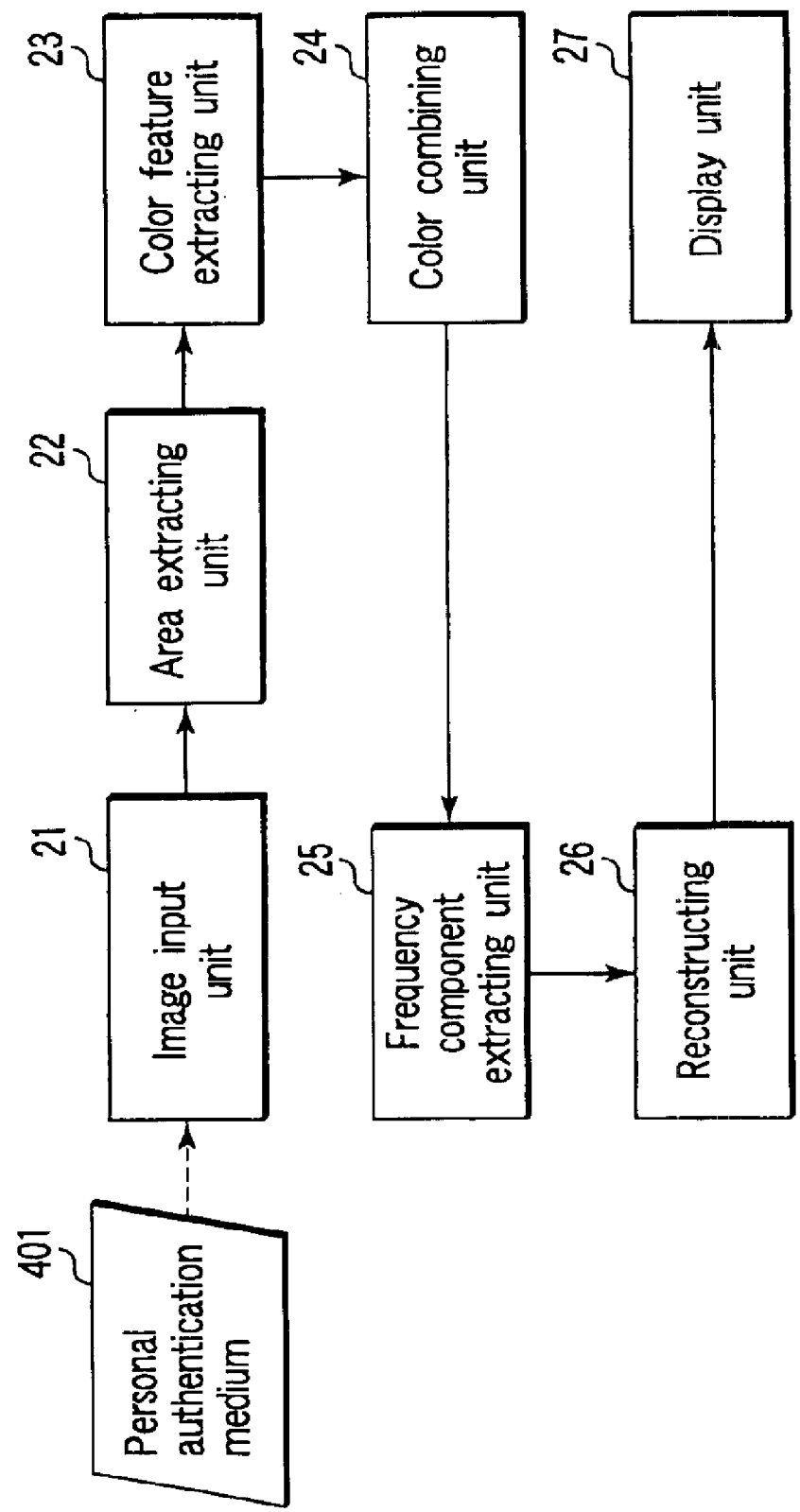
F I G. 16

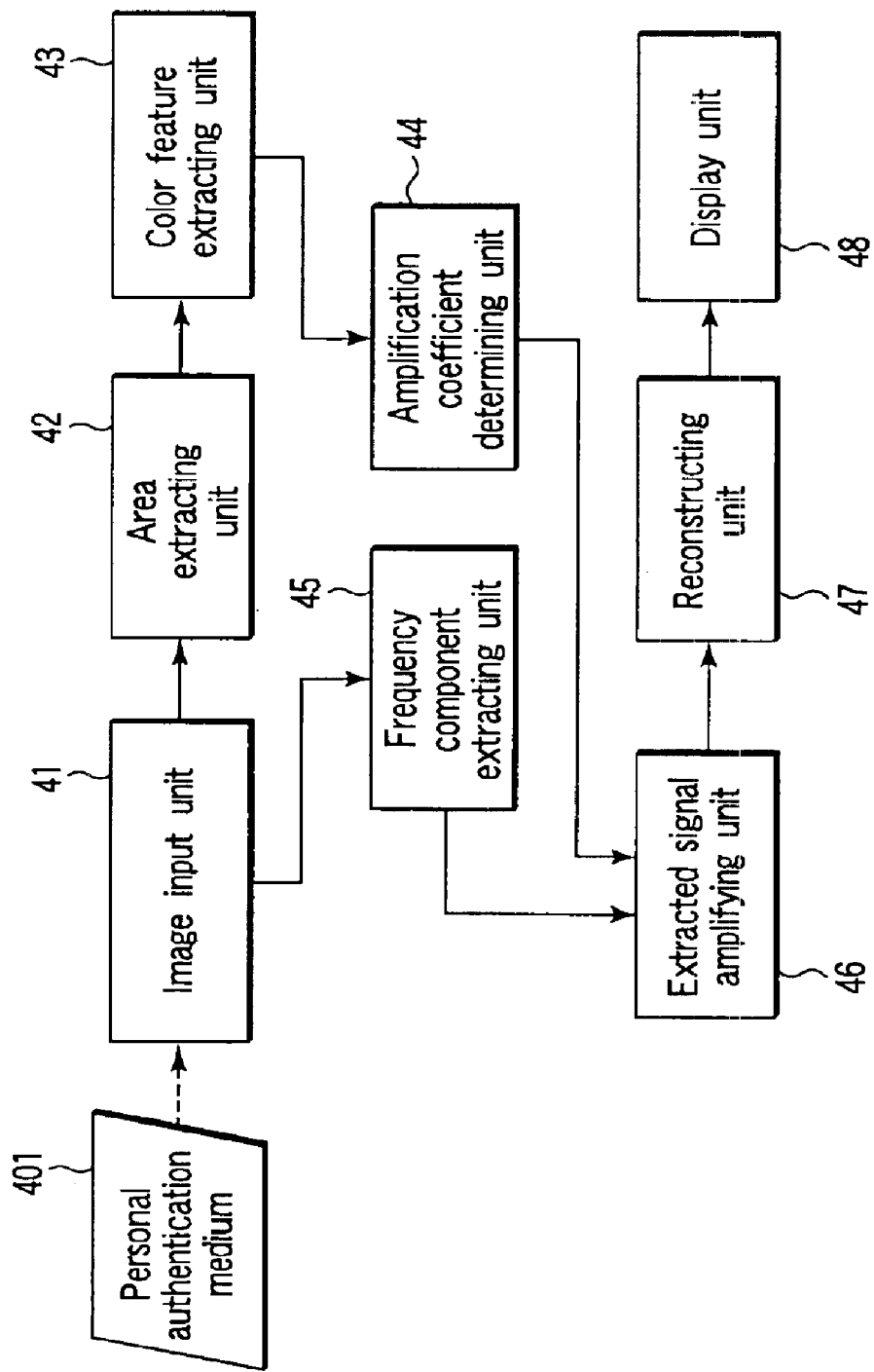
F I G. 18

IMAGE PROCESSING SYSTEM

CROSS-REFERENCE TO RELATED APPLICATIONS

This application is based upon and claims the benefit of priority from prior Japanese Patent Applications No. 2003-122346, filed Apr. 25, 2003; and No. 2004-075020, filed Mar. 16, 2004, the entire contents of both of which are incorporated herein by reference.

BACKGROUND OF THE INVENTION

1. Field of the Invention

The present invention relates to an image processing system which creates composite image information by embedding, in visible main image information (e.g., a human facial image), another additional sub-information (e.g., security information) in an invisible state, records the created composite image information on a recording medium, and restores the embedded sub-information from the recorded composite image information, and an image processing method and apparatus used in the image processing system.

2. Description of the Related Art

Recently, with the trend toward computerization of information and the proliferation of the Internet, increasing importance has been attached to a digital watermarking technique, digital signature technique, and the like to prevent counterfeiting and alteration of images. The digital watermarking technique of embedding additional sub-information (sub-image information) in main image information in an invisible state, in particular, has been provided as a counter-measure against unauthorized copying, counterfeiting, and tampering of a personal authentication medium such as an ID card or a photograph in which copyright information is embedded.

For example, Jpn. Pat. Appln. KOKAI Publication No. 9-248935 discloses en digital watermark insertion method of embedding data in image data output onto printed matter by using the characteristics of high spatial frequency components and color difference components which are difficult for man to perceive. Jpn. Pat. Appln. KOKAI Publication No. 2001-268346 discloses a printing apparatus for digital watermarks that can be recognized through optical filters.

In Jpn. Pat. Appln. KOKAI Publication No. 9-248935, there is a description about a method of predicting the degree of deterioration and increasing the strength of embedding in accordance with the predicted degree. This method, however, increases the risk of disclosing sub-information.

A sublimation/thermal transfer recording scheme is generally used to record facial images for personal authentication on various kinds of ID cards such as driver's licenses and personal authentication media typified by membership cards.

In general, in the sublimation/thermal transfer recording scheme, materials that can be dyed with sublimable materials are limited. This scheme can therefore be adapted to only limited recording media. For this reason, the degree of freedom in selecting recording media as personal authentication media on which facial images for personal authentication are recorded is low. As a consequence, easily available media must be selected. This often decreases the security. In addition, sublimable dyes generally have poor image durability, e.g., poor light resistance and poor solvent resistance.

In contrast to this, in a fusion thermal transfer recording scheme, a material having good light resistance can be generally selected as a coloring material. This scheme therefore allows a high degree of freedom of choice regarding recording media. In the scheme, therefore, a high-specialty recording medium can be used. This makes it possible to improve security. The fusion thermal transfer recording scheme, however, uses a dot area gradation method of performing gradation recording by changing the sizes of transferred dots. With this scheme, therefore, it is difficult to realize as high gradation performance as that with the sublimation/thermal transfer recording scheme.

In order to solve this problem, for example, Jpn. Pat. Appln. KOKOKU Publication No. 6-59739 discloses a method of recording transferred dots in a so-called staggered array (this method will be referred to as an alternate driving/recording scheme hereinafter).

Jpn. Pat. Appln. KOKOKU Publication No. 6-59739 discloses a recording method of improving the gradation recording performance in the fusion thermal transfer recording scheme. If, however, facial image information in which watermark information is embedded by using a digital watermarking technique is recorded, data is thinned out in a staggered pattern, resulting in loss of corresponding information. This destroys the digital watermark information.

BRIEF SUMMARY OF THE INVENTION

It is, therefore, an object of the present invention to provide an image processing system and image processing method and apparatus which can create composite image information constituted by main image information and another additional sub-information embedded in the main image information in an invisible state for analog data output to a recording medium, and maintain the digital watermark information in the composite image information after recording.

It is another object of the present invention to provide an image processing system and image processing method and apparatus which can apply a digital watermarking technique to a to-be-recorded image while maintaining high gradation performance in the fusion thermal transfer recording scheme, and allow the watermark information (sub-information) to be stored and restored without destruction after it is recorded.

It is still another object of the present invention to provide an image processing system and image processing method and apparatus which can restore a digital watermark which is resistant to a deterioration in image information.

It is still another object of the present invention to provide an image processing method and apparatus which can improve restoration characteristics and visibility of embedded sub-information without increasing the risk of disclosing the sub-information.

According to the present invention, there is provided an image processing system comprising a first image processing apparatus which records, on a recording medium, composite image information created by embedding invisible sub-information in visible main image information, and a second image processing apparatus which restores the sub-information from the composite image information recorded on the recording medium by the first image processing apparatus, the first image processing apparatus including a pre-processing unit which performs, for main image information, pre-processing corresponding to pixel formation processing for image recording in the first image processing apparatus, an embedding processing unit which creates composite image information by embedding sub-information in main image information in an invisible state using the main image information, the sub-information, and key information used to restore the sub-information, and a recording unit which records the composite image information created by the embedding processing unit on a recording medium, and the second image processing apparatus including an image input unit which inputs the composite image information from the recording medium on which the composite image information is recorded by the recording unit of the first image processing apparatus, a frequency component extracting unit which extracts a spatial frequency component unique to the key information from the composite image information input by the image input unit, and a reconstructing unit which reconstructs the sub-information from the spatial frequency component extracted by the frequency component extracting unit.

According to the present invention, there is provided an image processing system comprising a first image processing apparatus which records, on a recording medium, composite image information created by embedding invisible sub-information in visible main image information, and a second image processing apparatus which restores the sub-information from the composite image information recorded on the recording medium by the first image processing apparatus, the first image processing apparatus including a first pre-processing unit which performs, for main image information, first pre-processing corresponding to pixel formation processing for image recording in the first image processing apparatus, a second pre-processing unit which performs geometric transformation with respect to the main image information having undergone the first pre-processing by the first pre-processing unit, an embedding processing unit which creates composite image information by embedding sub-information in main image information in an invisible state using the main image information, the sub-information, and key information used to restore the sub-information, an inverse transformation unit which performs transformation processing inverse to the transformation processing by the second pre-processing unit with respect to the composite image information created by the embedding processing unit, and a recording unit which records the composite image information having undergone the inverse transformation processing by the inverse transformation unit by an alternate driving/recording scheme of alternately forming even-numbered and odd-numbered pixels in a main scanning direction of a recording device on a recording line basis, and the second image processing apparatus including an image input unit which inputs the composite image information from the recording medium on which the composite image information is recorded by the recording unit of the first image processing apparatus, a frequency component extracting unit which extracts a spatial frequency component unique to the key information from the composite image information input by the image input unit, and a reconstructing unit which reconstructs the sub-information from the spatial frequency component extracted by the frequency component extracting unit.

According to the present invention, there is provided an image processing apparatus comprising an image input unit which inputs composite image information from a recording medium on which the composite image information is recorded, which is created by color difference modulation processing using visible main image information, sub-information embedded in the main image information in an invisible state, and key information used to restore the sub-information, a frequency component extracting unit which extracts a spatial frequency component unique to the key information from the composite image information input by the image input unit, and a reconstructing unit which reconstructs the sub-information from the spatial frequency component extracted by the frequency component extracting unit.

According to the present invention, there is provided an image processing apparatus comprising an image input unit which inputs composite image information from a recording medium on which the composite image information is recorded, which is created by color difference modulation processing using visible main image information, sub-information embedded in the main image information in an invisible state, and key information used to restore the sub-information, a color component information storage unit which stores color component information, a color component extracting unit which extracts a color component from the composite image information input by the image input unit on the basis of the color component information stored in the color component information storage unit, a frequency component extracting unit which extracts a spatial frequency component unique to the key information from the color component extracted by the color component extracting unit, and a reconstructing unit which reconstructs the sub-information from the spatial frequency component extracted by the frequency component extracting unit.

According to the present invention, there is provided an image processing apparatus comprising an image input unit which inputs composite image information from a recording medium on which the composite image information is recorded, which is created by color difference modulation processing using visible main image information, sub-information embedded in the main image information in an invisible state, and key information used to restore the sub-information, an area extracting unit which extracts a local area from the composite image information input by the image input unit, a color feature extracting unit which extracts a color feature in the local area extracted by the area extracting unit from the local area, a color combining unit which creates color component composite image information by combining color components on the basis of the color feature extracted by the color feature extracting unit, a frequency component extracting unit which extracts a spatial frequency component unique to the key information from the color component composite image information created by the color combining unit, and a reconstructing unit which reconstructs the sub-information from the spatial frequency component extracted by the frequency component extracting unit.

According to the present invention, there is provided an image processing apparatus comprising an image input unit which inputs composite image information from a recording medium on which the composite image information is recorded, which is created by color difference modulation processing using visible main image information, sub-information embedded in the main image information in an invisible state, and key information used to restore the sub-information, an area extracting unit which extracts a local area from the composite image information input by the image input unit, a color feature extracting unit which extracts a color feature in the local area extracted by the area extracting unit from the local area, a reconstruction parameter determining unit which determines a reconstruction parameter on the basis of the color feature extracted by the color feature extracting unit, a frequency component extracting unit which extracts a spatial frequency component unique to the key information from the composite image information input by the image input unit, and a reconstructing unit which reconstructs the sub-information from the spatial frequency component extracted by the frequency component extracting unit by using the reconstruction parameter determined by the reconstruction parameter determining unit.

According to the present invention, there is provided an image processing method comprising inputting composite image information from a recording medium on which the composite image information is recorded, which is created by color difference modulation processing using visible main image information, sub-information embedded in the main image information in an invisible state, and key information used to restore the sub-information, extracting a spatial frequency component unique to the key information from the composite image information input from the recording medium, and reconstructing the sub-information from the spatial frequency component extracted by extracting the frequency component.

According to the present invention, there is provided an image processing method comprising inputting composite image information from a recording medium on which the composite image information is recorded, which is created by color difference modulation processing using visible main image information, sub-information embedded in the main image information in an invisible state, and key information used to restore the sub-information, extracting a color component from the composite image information input from the recording medium on the basis of the color component information stored in a color component information storage unit, extracting a spatial frequency component unique to the key information from the extracted color component, and reconstructing the sub-information from the extracted spatial frequency component.

According to the present invention, there is provided an image processing method comprising inputting composite image information from a recording medium on which the composite image information is recorded, which is created by color difference modulation processing using visible main image information, sub-information embedded in the main image information in an invisible state, and key information used to restore the sub-information, extracting a local area from the composite image information input from the recording medium, extracting a color feature in a local area extracted the composite image information from the local area, creating color component composite image information by combining color components on the basis of the color feature extracted from the local area, extracting a spatial frequency component unique to the key information from the created color component composite image information, and reconstructing the sub-information from the extracted spatial frequency component.

According to the present invention, there is provided an image processing method comprising inputting composite image information from a recording medium on which the composite image information is recorded, which is created by color difference modulation processing using visible main image information, sub-information embedded in the main image information in an invisible state, and key information used to restore the sub-information, extracting a local area from the composite image information input from the recording medium, extracting a color feature in the extracted local area from the local area, determining a reconstruction parameter on the basis of the color feature extracted from the local area, extracting a spatial frequency component unique to the key information from the composite image information input from the recording medium, and reconstructing the sub-information from the spatial frequency component extracted by extracting the frequency component by using the reconstruction parameter determined on the basis of the color feature.

Additional objects and advantages of the invention will be set forth in the description which follows, and in part will be obvious from the description, or may be leaned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 10A is a schematic view for explaining the frequency component of key information;

FIG. 10B is a schematic view for explaining the frequency component of the key information;

FIG. 16 is a block diagram schematically showing the arrangement of a second image processing apparatus according to the third embodiment of the present invention;

FIG. 18 is a block diagram schematically showing the arrangement of a second image processing apparatus according to the fourth embodiment of the present invention.

DETAILED DESCRIPTION OF THE INVENTION

Embodiments of the present invention will be described below with reference to the views of the accompanying drawing.

The first embodiment will be described first.

Figure 1:
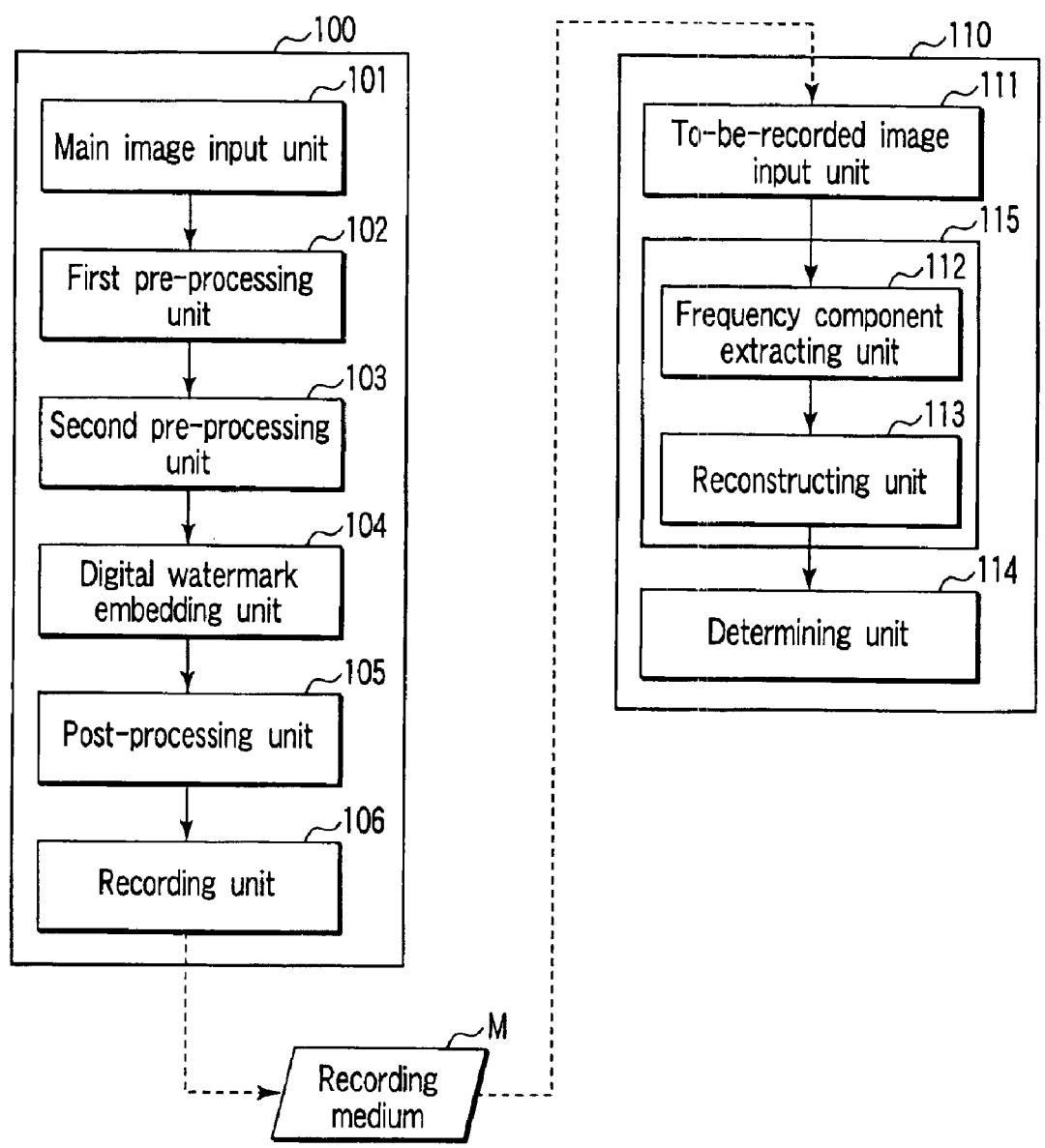
FIG. 1 is a block diagram schematically showing the overall arrangement of an image processing system according to the first embodiment of the present invention.

FIG. 1 schematically shows the overall arrangement of an image processing system according to the first embodiment. The image processing system shown in FIG. 1 is applied to, for example, processing of facial images for personal authentication on personal authentication media such as ID cards. The image processing system shown in FIG. 1 is comprised of a first image processing apparatus 100 and second image processing apparatus 110. The first image processing apparatus 100 records, on a recording medium M, composite image information created by embedding sub-information (sub-image information) in main image information, which is visible to the naked human eye, in an invisible state to the naked human eye. The second image processing apparatus 110 restores the embedded sub-information from the composite image information recorded on the recording medium M by the first image processing apparatus 100.

The first image processing apparatus 100 includes a main image input unit 101, first pre-processing unit 102, second pre-processing unit 103, digital watermark embedding unit 104, post-processing unit 105, and recording unit 106.

The function of each unit of the first image processing apparatus 100 will be described in detail below.

The main image input unit 101 captures a facial image of the holder of a personal authentication medium and converts it into digital image information. The main image input unit 101 inputs a facial image of the holder of the personal authentication medium or captures a facial portrait using an image input unit such as a scanner, thereby digitalizing the personal facial image information. At this point of time, the main image information (facial image information) has three planes, i.e., R (red), G (green), and B (blue) planes.

The first pre-processing unit 102 converts the facial image information (to be also referred to as main image information hereinafter) captured by the main image input unit 101 into a form suitable for pixel formation processing by the recording unit 106 (to be described later).

The second pre-processing unit 103 converts the image information converted by the first pre-processing unit 102 into a form suitable for digital watermark embedding processing.

The digital watermark embedding unit 104 embeds digital watermark information in the image information converted by the second pre-processing unit 103 by using key information.

The post-processing unit 105 performs processing inverse to the processing by the second pre-processing 103 for the image information in which the digital watermark is embedded to convert the information back to a form suitable for pixel formation processing by the recording unit 106 (to be described later).

The recording unit 106 prints/records, on the recording medium M, the composite image information in which the digital watermark is embedded, on the basis of the image information converted by the post-processing unit 105.

Figure 2:
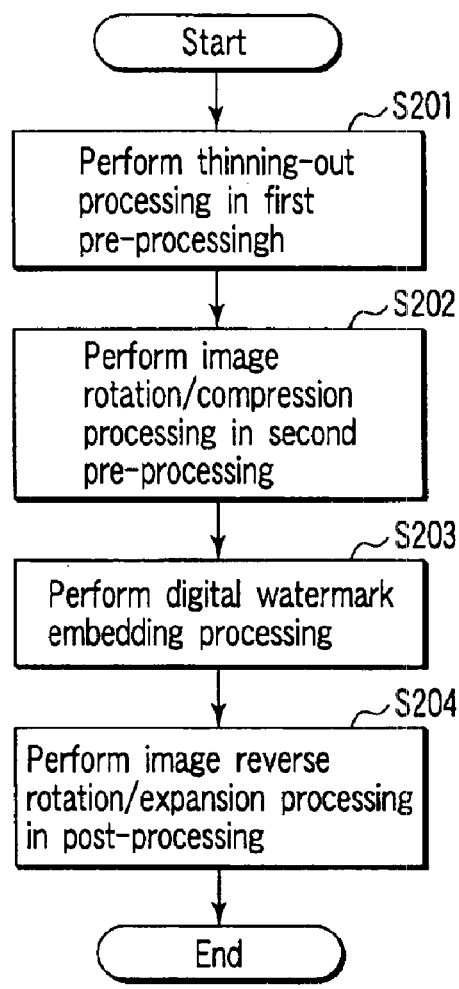
FIG. 2 is a flowchart for explaining the flow of processing from the first pre-processing unit to the post-processing unit.

The units ranging from the first pre-processing unit 102 to the post-processing unit 105 embed a digital watermark in main image information and convert it into a form suitable for pixel formation processing by the recording unit 106. The flow of these processes will be described with reference to the flowchart shown in FIG. 2.

First of all, the first pre-processing unit 102 performs the first pre-processing corresponding to pixel formation processing by the recording unit 106 for the main image information captured by the main image input unit 101 to create main image information having undergone the first pre-processing (step S201). In this case, the first pre-processing unit 102 performs thinning-out (invalidation) processing for the main image information.

The second pre-processing unit 103 performs geometric transformation processing for the main image information having undergone the first pre-processing which is created in step S201, thereby creating image information subjected to embedding (step S202). In this case, the second pre-processing unit 103 performs rotation processing for the main image information having undergone the first pre-processing, and removes pixel portions thinned out in the first pre-processing to compress the effective image size.

The digital watermark embedding unit 104 performs digital watermark embedding processing for the image information subjected to embedding (main image information having undergone the second pre-processing) created in step S202 (step S203). In this case, the digital watermark embedding unit 104 creates composite image information by embedding, in image information subjected to embedding, sub-information in an invisible state in which the information cannot be perceived by the human eye.

The post-processing unit 105 then creates to-be-recorded image information by performing post-processing for the composite image information created in step S203 (step S204). In this case, the post-processing unit 105 performs reverse rotation processing for the composite image information, and expands the effective image size by adding the pixel portions removed in the second pre-processing.

Note that digital watermark embedding processing is not limited to R (red), G (green), and B (blue) data. For example, color conversion (to be described later) may be performed first, and then digital watermark embedding processing may be performed for data having three planes, i.e., C (C (cyan), M (magenta), and Y (yellow) planes.

The recording unit 106 prepares a personal authentication medium by printing/recording the to-be-recorded image information created by the post-processing unit 105 on the recording medium M serving as a personal authentication medium. More specifically, the recording unit 106 performs color conversion of R (red), G (green), and B (blue) of the respective pixels of the to-be-recorded image information into C (cyan), M (magenta), and Y (yellow). For example, this color conversion method uses a 3×3 or 3×9 color conversion matrix or LUT (lookUp Table) in accordance with the characteristics of a recording device. The recording unit 106 then generates a driving signal for controlling the recording device from the pieces of C, M, and Y image information. In the case of the fusion thermal transfer recording scheme, for example, a driving voltage control signal, driving pulse signal, and the like for a thermal head are generated. The recording unit 106 also performs heat control for the thermal head. Finally, the recording unit 106 records the composite image information on the recording medium M by alternately forming even-numbered and odd-numbered pixels in the main scanning direction of the recording device represented by a thermal head on a recording line basis.

Figure 3:
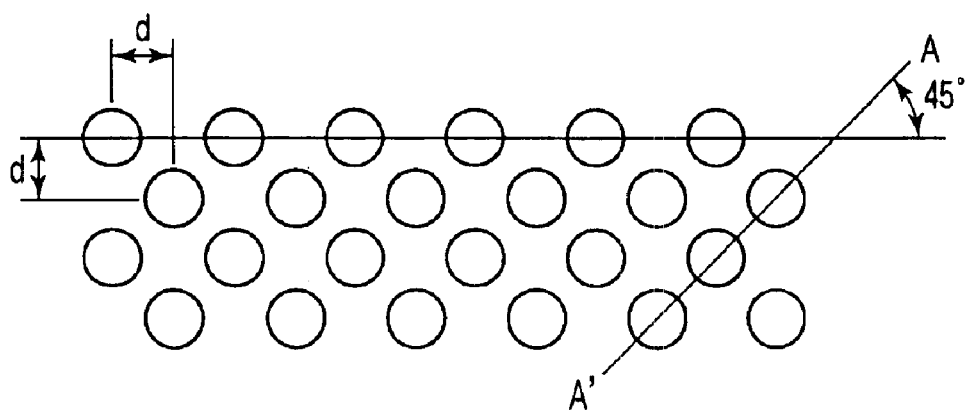
FIG. 3 is a view showing how recorded dots are arrayed.

The dots formed on the recording medium M are arrayed as shown in FIG. 3. On a line A–A' in FIG. 3, the respective dots are arranged at a pitch d ($1/\sqrt{2}$ the pitch of the heating elements of the thermal head) instead of every other dot and are arrayed in a line in a 45° direction.

Figure 4:
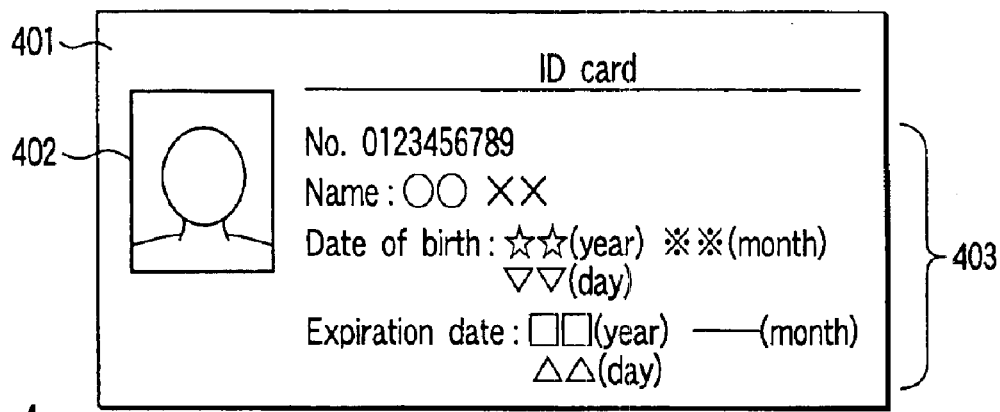
FIG. 4 is a plan view schematically showing an example of a generated personal authentication medium.

FIG. 4 shows an example of a personal authentication medium 401 such as an ID card prepared by the recording unit 106. A personal authentication facial image 402 of the holder is recorded on the personal authentication medium 401. The facial image 402 is the image created and recorded by the processing described with reference to FIG. 2. In addition, personal management information 403 such as an identification number (No.), name, date of birth, and expiration date is recorded on the personal authentication medium 401. The personal management information 403 is used as the sub-information in the digital watermark embedding processing in step S203 in FIG. 2. Consequently, the personal authentication facial image 402 of the personal authentication medium 401 is associated with the personal management information 403. This makes it difficult to partly tamper or counterfeit the personal authentication medium 401, resulting in an improvement in security.

The second image processing apparatus 110 is comprised of an to-be-recorded image input unit 111, restoring unit 115, and determining unit 114.

The function of each unit of the second image processing apparatus 110 will be described in detailed below.

The to-be-recorded image input unit 111 reads/inputs, for example, the composite image information 403 recorded on the personal authentication medium 401 in FIG. 4, and converts it into digital image information. The to-be-recorded image input unit 111 captures the composite image information 403 recorded on the personal authentication medium 401 by using an image input device such as a camera, and converts the information into digital composite image information. At this point of time, the image information has three planes, i.e., R (red), G (green), and B (blue) planes, as in the case of the main image input unit 101.

The restoring unit 115 restores digital watermark information (sub-information) from the composite image information captured by the to-be-recorded image input unit 111. The restoring unit 115 is comprised of a frequency component extracting unit 112 and reconstructing unit 113.

The frequency component extracting unit 112 extracts the spatial frequency component of key information from the composite image information captured by the to-be-recorded image input unit 111. The frequency component extracting unit 112 frequency-filters the composite image information captured by the to-be-recorded image input unit 111 to extract the amplitude (=strength) information of the frequency component of the embedded key information.

The reconstructing unit 113 reconstructs digital watermark information (sub-information) from the spatial frequency component extracted by the frequency component extracting unit 112. The reconstructing unit 113 performs totalization processing and spatial filtering for the amplitude information and phase information of the spatial frequency component extracted by the frequency component extracting unit 112, thereby reconstructing a modulated component, i.e., sub-information, with respect to the key information.

The determining unit 114 determines the authenticity of the personal authentication medium on the basis of the digital watermark information restored by the restoring unit 115. The determining unit 114 collates the sub-information (personal management information) restored by the restoring unit 115 with the personal management information 403 on the personal authentication medium 401 which is captured by the to-be-recorded image input unit 111, thereby determining the authenticity of the personal authentication medium 401.

An alternate driving/recording scheme and a fusion thermal transfer recording scheme of recording dots in a staggered array according to the first embodiment will be described next.

In the fusion thermal transfer recording scheme, an image is formed based on the presence/absence of dots. When a multi-tone image is to be expressed in the above fusion thermal transfer recording scheme, therefore, the apparent density is controlled by performing area modulation processing of changing the areas of dots. For this reason, in the fusion thermal transfer recording scheme, it is required to accurately modulate the sizes of dots. In order to meet this requirement, the alternate driving/recording scheme is preferably used.

Figure 5A:
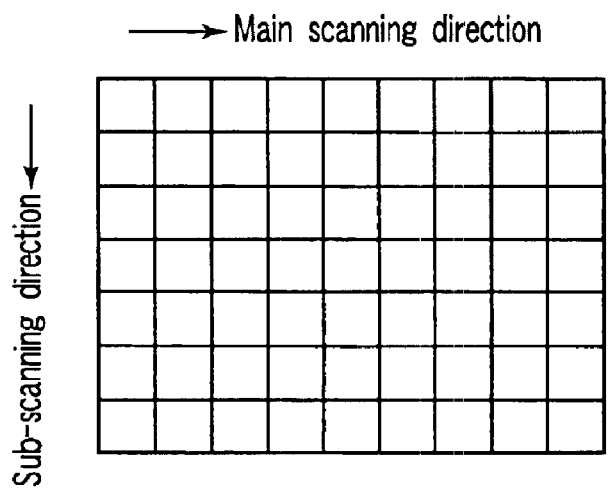
FIG. 5A is a view showing a specific example of image information to be recorded.
Figure 5B:
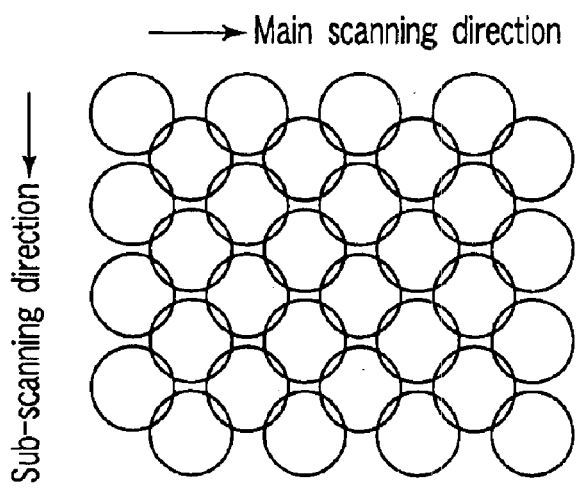
FIG. 5B is a view showing a specific example of dots to be recorded.

The above alternate driving/recording scheme is a scheme of alternately driving the odd-numbered heating elements of the odd-numbered lines and the even-numbered heating elements of the even-numbered lines of the recording head (line thermal head) on a recording line basis. Assume that image information to be recorded is arranged in a lattice pattern, as shown in FIG. 5A. In actual recording operation, the image information is recorded in a staggered pattern to form an image, as shown in FIG. 5B. Therefore, the even-numbered information of each odd-numbered line and the odd-numbered information of each even-numbered line of the image information to be recorded are omitted in actual recording operation.

This indicates that even if sub-information is embedded in image information (to be simply recorded) in an invisible state by using digital watermark embedding processing, only the area ½ that of the original image information becomes effective. That is, ½ the original image information becomes ineffective, and the information of the ineffective portion is omitted. This means that the digital watermark is destroyed or changed. In general, when a digital watermark is destroyed in the this manner, it is very difficult to restore sub-information. This makes it impossible to maintain security.

In the first embodiment, therefore, in performing the digital watermark embedding processing in step S203, the first pre-processing in step S201 and the second pre-processing in step S202 are performed. In addition, after the digital watermark embedding processing in step S203, the post-processing in step S204 is performed. This makes it possible to prevent the destruction of the digital watermark in alternate driving/recording operation.

Figure 6A:
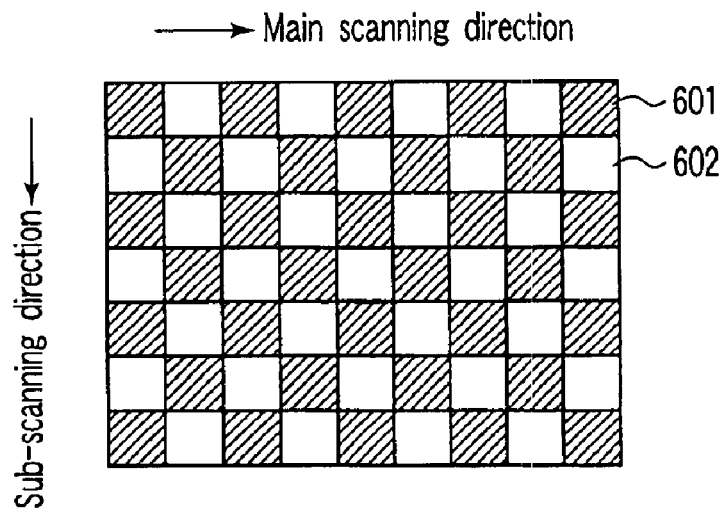
FIG. 6A is a view for explaining the concepts of the first pre-processing and second pre-processing.
Figure 6B:
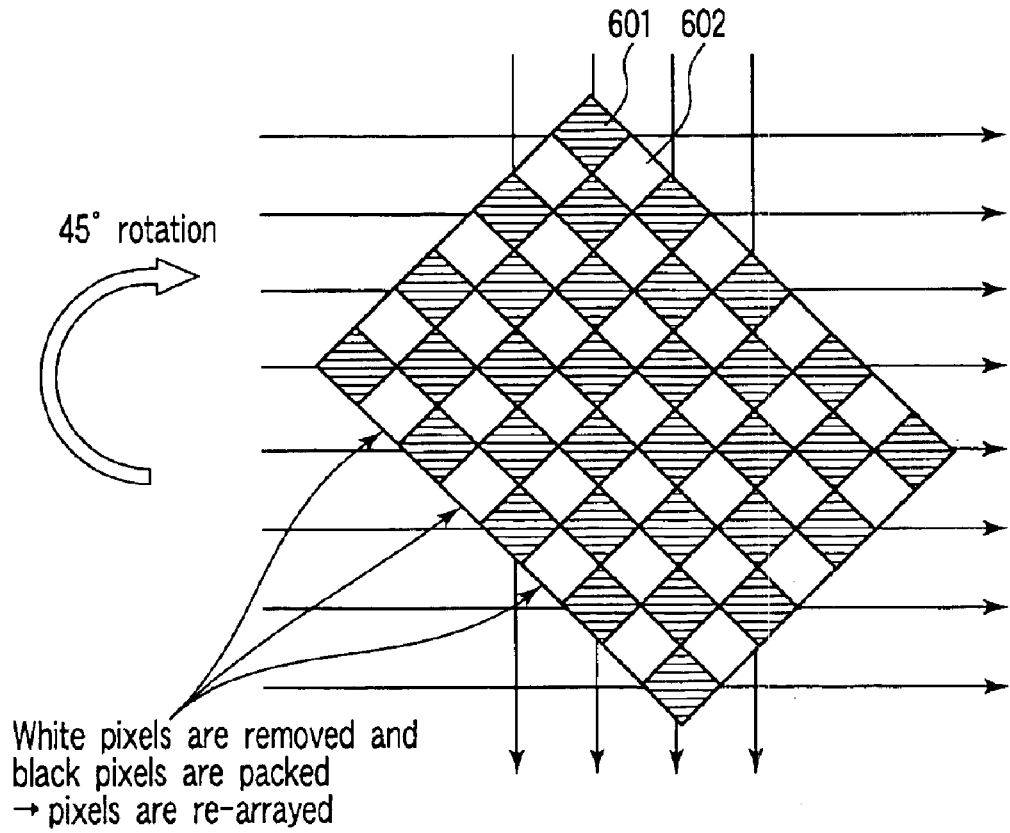
FIG. 6B is a view for explaining the concepts of the first pre-processing and second pre-processing.

In the first embodiment, the concepts of the first pre-processing and second pre-processing will be described below with reference to FIGS. 6A and 6B.

In the first pre-processing (step S201), image information corresponding to pixels to which no energy is applied in the alternate driving/recording scheme is thinned out. FIG. 6A shows an example of the pixel array of the overall image information to be recorded. Referring to FIG. 6A, black portions 601 correspond to pixels to be recorded (information not to be thinned out), and white portions 602 correspond to pixels not to be recorded (information to be thinned out).

In the second pre-processing (step S202), for example, 45° rotation processing and processing of removing thinned-out information are performed for the array of the image information having undergone the first pre-processing to compress the effective image information size. FIG. 6B shows the image information obtained when the image information array shown in FIG. 6A is rotated through 45°. As shown in FIG. 6B, when the pixel array shown in FIG. 6A is rotated through 45°, the black portions 601 (information not to be thinned out) and the white portions 602 (information to be thinned out) are aligned in the main scanning direction. In the second processing, therefore, the white portions 602 (portions to be thinned out) are removed and the resultant information is arrayed again. As a consequence, in the second processing, an array of only image information free from the influence of the alternate driving/recording scheme can be created.

Figures 7A, 7B, 7C, 7D:
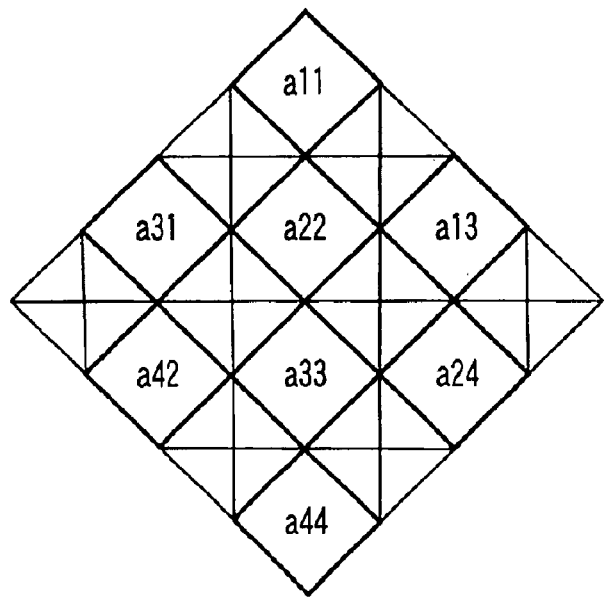
FIG. 7A is a view for explaining a specific example of the first pre-processing and second pre-processing.
FIG. 7B is a view for explaining a specific example of the first pre-processing and second pre-processing.
FIG. 7C is a view for explaining a specific example of the first pre-processing and second pre-processing.
FIG. 7D is a view for explaining a specific example of the first pre-processing and second pre-processing.

The first pre-processing and second pre-processing will be further described in detail with reference to specific examples shown in FIGS. 7A, 7B, 7C, and 7D. FIG. 7A is a view showing a specific example of image information to be recorded. FIG. 7B is a view showing the image information obtained by performing thinning-out processing for the image information shown in FIG. 7A. FIG. 7C is a view showing the image information obtained when 45° rotation processing is performed for the image information shown in FIG. 7B. FIG. 7D is a view showing the image information obtained when rearrangement processing is performed for the image information shown in FIG. 7C.

FIG. 7A shows the array of the respective pixels (aij (i=1 to 4, j=1 to 4)) of image information to be recorded. In the first pre-processing, the above thinning-out processing is performed for the image information shown in FIG. 7A. With this processing, in the pixel array of the image information shown in FIG. 7A, the even-numbered information of the odd-numbered lines (pixels a12, a14, a32, and a34) and the odd-numbered information of the even-numbered lines (pixels a21, a23, a41, and a43) are thinned out. As a result, the image information shown in FIG. 7A becomes the image information from which the array elements marked X are deleted as shown in FIG. 7B.

In the second pre-processing, the image information having undergone the thinning-out processing in the first pre-processing is rotated through 45° (rotation processing). When the image information shown in FIG. 7B is rotated through 45°, the image information shown in FIG. 7C is formed. In the second pre-processing, the effective pixels of the image information shown in FIG. 7C are re-arrayed. In the case shown in FIG. 7C, the remaining information (pixels a11, a13, a22, a24, a31, a33, a42, and a44) after the removal of the portions marked X is effective pixels. For this reason, the effective pixels of the image information shown in FIG. 7C are re-arrayed in the second pre-processing, as shown in FIG. 7D. Note that information ("0" in this case) which indicates that no information is recorded is stored in each array element as an empty space, as shown in FIG. 7D.

In the case shown in FIG. 7D, the thick frame portion is image information to be actually recorded. When, therefore, the image information shown in FIG. 7A is compared with the image information shown in FIG. 7D, the area in which the pixels of the image information which is actually recorded or free from the influence of alternate driving/recording are arrayed is reduced. That is, when digital watermark embedding processing is so performed as to make sub-information fall within the thick frame portion in FIG. 7D, the sub-information can be completely held.

Note that post-processing (step S204) is processing totally reverse to the first pre-processing and second pre-processing described above. Although the first embodiment has exemplified the fusion thermal transfer recording scheme, the image processing in the first embodiment can be applied to any recording scheme as long as it realizes gradation expression by dot area modulation of to-be-recorded pixels.

Figure 8:
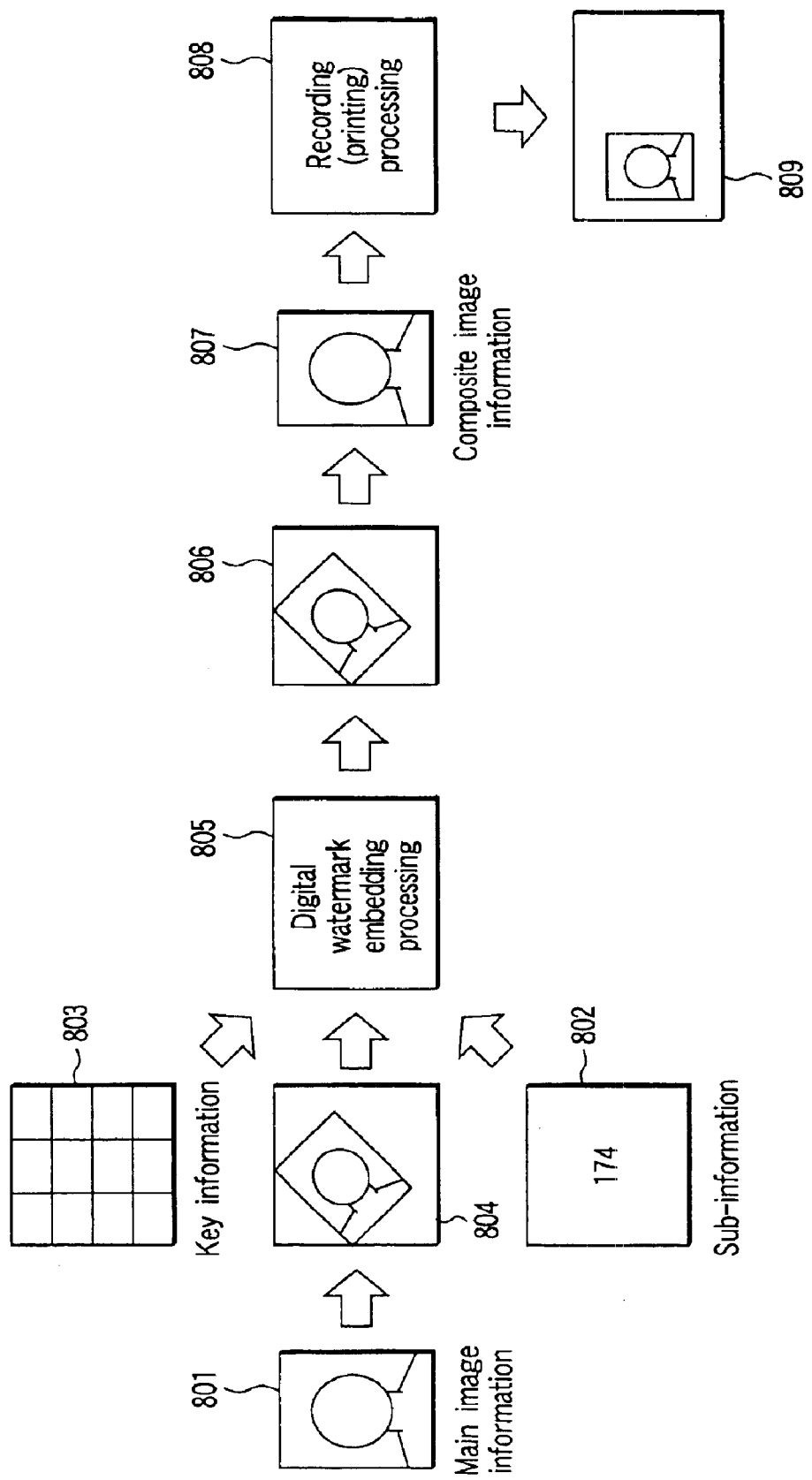
FIG. 8 is a view showing the flow of overall digital watermark embedding processing.

FIG. 8 schematically shows a processing sequence in this image processing system.

Referring to FIG. 8, assume that main image information 801 is, for example, facial image information for personal authentication. In addition, sub-information 802 is, for example, information for improving the security of the main image information 801 (the numeral "174" in this case). For example, an image obtained by coding a name, date of birth, and the like or a graphic pattern such as a company logo is used as the sub-information 802. Key information 803 is information serving as a key for restoring the sub-information embedded in an invisible state by digital watermark embedding processing.

First of all, image information 804 subjected to embedding is created by performing the first pre-processing and second pre-processing for the main image information 801. Digital watermark embedding processing 805 is then performed by using the image information 804 subjected to embedding, sub-information 802, and key information 803 to create digital watermarked image information 806. Post-processing is performed as transformation processing inverse to the first pre-processing and second pre-processing to generate composite image information 807. Finally, a personal authentication medium 809 is completed by executing recording (printing) processing 808 of recording the created composite image information 807.

Digital watermark embedding processing will be described in detail next.

A general digital watermark embedding technique can be applied to digital watermark embedding processing in this embodiment. The digital watermark embedding processing in this embodiment is especially compatible with a technique of performing digital watermark embedding by superimposing sub-information on main image information.

The digital watermark embedding techniques that can be applied to this embodiment are disclosed in, for example, Jpn. Pat. Appln. KOKAI Publication Nos. 11-168616 and 2001-268346. These techniques are described on the premise that main image information is basically a color (full-color) image. By further applying, for example, the technique disclosed in Jpn. Pat. Appln. KOKAI Publication No. 11-355554 to these techniques, sub-information (sub-image information) can be embedded even in a monochrome image.

When the authenticity of a facial image (composite image information) printed on a personal authentication medium is to be determined, it is required to restore sub-information from the composite image information and determine the authenticity of the sub-information. This restoration processing of the sub-information is also disclosed in, for example, Jpn. Pat. Appln. KOKAI Publication Nos. 11-168616, 2001-268346, and 11-355554. That is, by performing the restoration processing disclosed in the above references using key information, the sub-information recorded in an invisible state can be restored from the composite image information printed on the personal authentication medium by this image processing system.

A case wherein the digital watermark embedding processing using the color difference modulation scheme described in Jpn. Pat. Appln. KOKAI Publication No. 11-168616 will be described as an example of digital watermark embedding processing.

Figure 9:
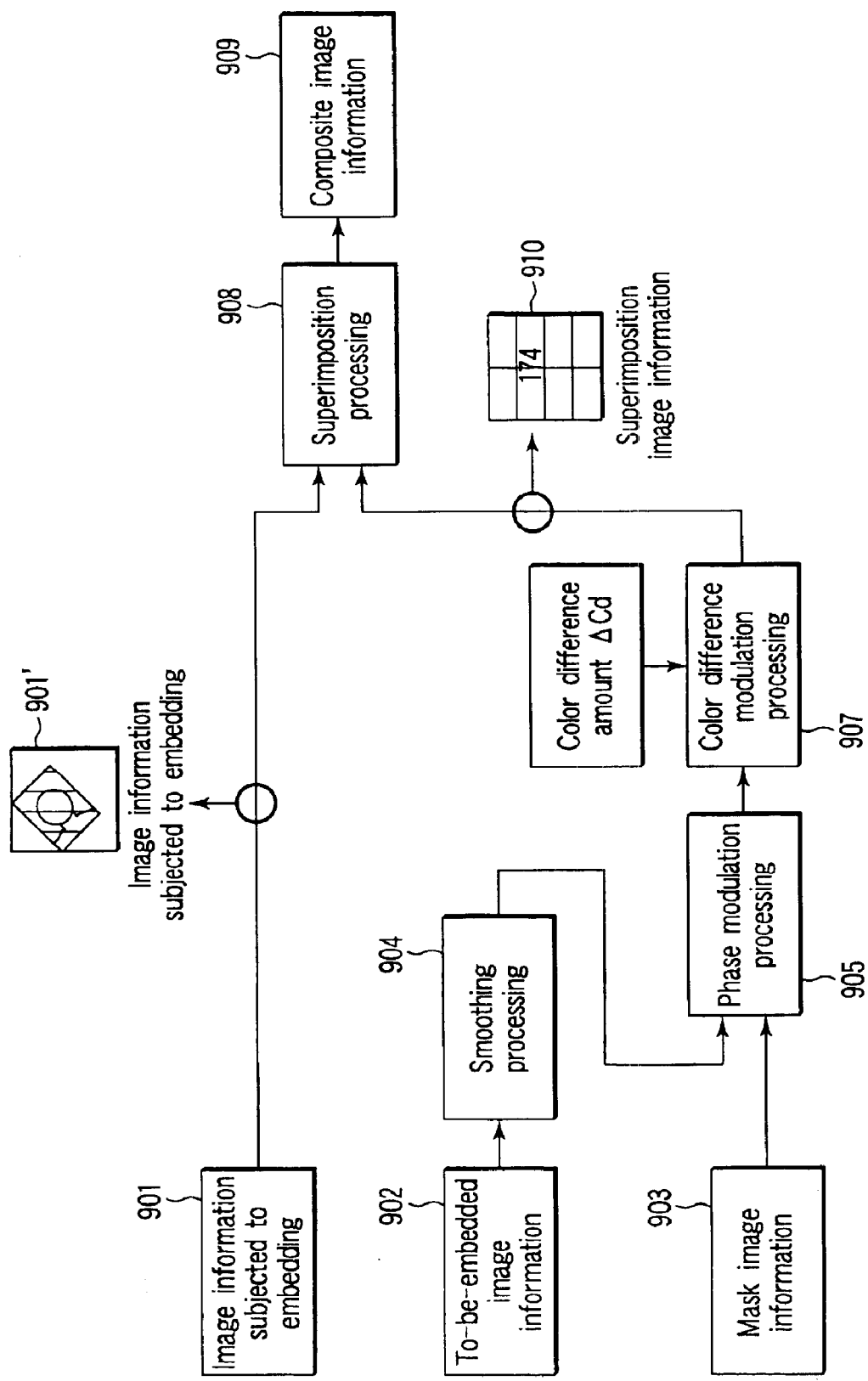
FIG. 9 is a flowchart schematically showing a sequence in digital watermark embedding processing.

FIG. 9 is a view for explaining the flow of digital watermark embedding processing using the color difference modulation scheme described in Jpn. Pat. Appln. KOKAI Publication No. 11-168616. In the digital watermark embedding processing, sub-information can be embedded in main image information in an invisible state without causing any image deterioration by using the following characteristics (1) to (3).

(1) Human Visual Characteristics

According to the human visual characteristics, as the frequency of an image increases, the gradation identification ability decreases, and color difference information becomes more difficult to discriminate than luminance information.

(2) Human Visual Characteristics Based on Complementary Color Relationship

For example, the additive color mixture of red and cyan (=green+blue) produces a complementary color relationship, so that when red and cyan are located side by side, they look achromatic (white), which is difficult to discriminate by the human eye.

(3) Human Visual Characteristics with Respect to Color Different (Complementary Color Relationship and Color Different Information (Color Difference Modulation Processing) to High-Frequency Carrier Pattern Image)

According to the human visual characteristics, small differences in color differences cannot be identified by the human eye. Therefore, when red rich pixels and cyan rich pixels are repeatedly arranged by using a high-frequency carry pattern image, the small differences in color differences between these pixels cannot be identified by the human eye, and hence it is determined that the color difference amount is plus or minus "0". The composite image information (digital watermarked image) generated by this scheme does not depend on the image format for storage. Therefore, as an image format for composite image information, a new future image format can be used as well as a currently available image format such as BMP, TIFF, or JPEG.

The flow of digital watermark embedding processing shown in FIG. 9 will be briefly described below. For details, refer to the descriptive contents of Jpn. Pat. Appln. KOKAI Publication No. 11-168616.

Image information (main image information) 901 subjected to embedding is image information in which to-be-embedded information is embedded. In a personal authentication medium, the main image information 901 corresponds to a facial portrait (facial image) of the holder of the medium. The main image information 901 has, for example, 24-bit information per pixel (eight bits for each of R, G, and B). To-be-embedded image information (sub-information) 902 is obtained by converting information to be embedded into a binary image. In a personal authentication medium, the above sub-information 902 corresponds to the identification number or the like. The sub-information 902 has, for example, 1-bit information per pixel. Mask image information (key information) 903 is image information used in image combining processing and restoration (reproduction) of embedded image information. For example, the key information 903 has 1-bit information per pixel.

Smoothing processing 904 is performed with each black pixel of the to-be-embedded image information 902 being converted into "1"; and each white pixel, "0". For example, in the smoothing processing 904, a (3×1)-pixel area including pixels on both ends of a target pixel in the x direction is extracted, and the weighted average of the extracted area is calculated. In phase modulation processing 905, phase modulation is performed for the mask image information 903 on the basis of the smoothing processing result obtained by the smoothing processing 904.

Color difference modulation processing 907 is performed using a color difference amount ΔCd on the basis of the phase modulation result obtained by the phase modulation processing 905. In the color difference modulation processing 907, for example, three components, i.e., R (red), G (green), and B (blue), are separately calculated. Composite image information 909 is generated by performing superimposition processing 908 on the basis of the color difference modulation processing result obtained by the color difference modulation processing 907 and the image information 901 subjected to embedding.

As is also obvious from the above description, the image information 901 subjected to embedding, to-be-embedded image information 902, and mask image information 903 in FIG. 9 are identical to the main image information 801, sub-information 802, and key information 803 in this embodiment described with reference to FIG. 8. The digital watermark embedding scheme shown in FIG. 9 can therefore be basically applied to this embodiment.

In this embodiment, however, in order to perform the first pre-processing and second pre-processing for main image information in advance, the array size of effective image information is smaller than the original size of the main image information as indicated by the thick frame in FIG. 7D. When, therefore, the composite image information 909 is to be generated by superimposing image information 901' subjected to embedding and superimposition image information 910 obtained by color difference modulation processing, as in the case of digital watermark embedding processing shown in FIG. 9, the effective portion ("174" in this case) of the superimposition image information 910 needs to completely fall within the hatched portion of the image information 901' subject to embedding.

With regard to the superimposition processing, the image information 901' subject to embedding, super-imposition image information 910, and composite image information 909 are defined as follows:

$$\text{image information subject to embedding: } SRC_{C(x, y)} \quad (A\text{-}1)$$

$$\text{superimposition image information: } STL_{C(x, y)} \quad (A\text{-}2)$$

$$\text{composite image information: } DES_{C(x, y)} \quad (A\text{-}3)$$

(where x and y are the coordinate values of each image, and C={R (red), G (green), B (blue)} plane.

In 24-bit color computation, each value is an integral value from 0 to 255.

In this case, the composite image information $DES_{C(x, y)}$ is represented as follows by using the image information $SRC_{C(x, y)}$ subject to embedding and superimposition image information $STL_{C(x, y)}$ $$DES_R(x, y) = SRC_R(x, y) + STL_R(x, y) \quad (B\text{-}1)$$

$$DES_G(x, y) = SRC_G(x, y) + STL_G(x, y) \quad (B\text{-}2)$$

$$DES_B(x, y) = SRC_B(x, y) + STL_B(x, y) \quad (B\text{-}3)$$

In the first embodiment, R (red), G (green), and B (blue) are used as fundamental colors for computation based on the additive color mixture. However, using C (cyan), M (magenta), and Y (yellow) as fundamental colors for computation based on the subtractive color mixture makes no substantial difference.

Sub-information restoration processing for the composite image information generated by the above digital watermark embedding processing will be described next. Sub-information is restored by extracting a specific spatial frequency component from the composite image information on the basis of the key information used in embedding processing, and reconstructing the sub-information from the spatial frequency component.

As key information, binary (monochrome) image information formed from a geometric pattern or the like can be used. For example, this pattern includes a monochrome checkered pattern formed by unit rectangles each having 1×2 pixels, and a pseudo-random pattern formed on the basis of a predetermined seed.

As a method of extracting a specific spatial frequency component on the basis of key information, a method using a spatial frequency filter can be used. A coefficient for the spatial frequency filter corresponding to the key information is calculated according to procedures (1) to (4) described below. Note that coefficients may be calculated and stored in advance, or a coefficient may be calculated before the execution of extraction processing or every time extraction processing is performed.

(1) The size of the key information is expanded/compressed on the basis of the resolution of the main image information, the resolution of the composite image information recorded on the recording medium, and the read resolution of the to-be-recorded image input unit 111.

(2) The expanded/compressed key information is Fourier-transformed into a frequency domain. Note that this transformation may be done with an integer or may be extended into a real or complex number.

(3) The passband of a filter is adjusted by referring to the transformed value.

(4) Fourier inverse transform is performed with respect to the value after adjustment, and the resultant value is set as a frequency filter coefficient.

The above procedures (1) to (4) will be described with reference to the specific example shown in FIGS. 10A and 10B. FIGS. 10A and 10B are schematic views showing an example of the frequency component of the key information.

Referring to FIG. 10A, a white circle 1001 represents white; and a black circle 1002, black. Reference numeral 1003 denotes a fundamental frequency waveform in the main scanning direction; and 1004, a fundamental frequency waveform in the sub-scanning direction. Referring to FIG. 10B, a white circle 1005 represents a main color rich dot; and a black circle 1006, a complementary color rich dot. In this case, if the main color is red (R), the complementary color is cyan (C). Reference numeral 1007 denotes a fundamental frequency waveform in the main scanning direction; and 1008, a fundamental frequency waveform in the sub-scanning direction.

Assume that the resolution of the main image information is 200 dpi, and the print resolution of the composite image information and the read resolution of the to-be-recorded image input unit 111 are 400 dpi. In this case, according to processing (1) described above, when embedding processing is performed by using the key information shown in FIG. 10A, composite image information like that shown in FIG. 10B is captured by the to-be-recorded image input unit 111.

The embedded key information is transformed into a shape 1009 shown in FIG. 10B. The fundamental frequency of this information is equal to that of the key information whose size is expanded by an amount corresponding to the ratio between the read resolution and the print resolution. In calculating a filter coefficient, therefore, changes in resolution in recording and reading operations are taken into consideration in advance.

In (2) to (4), a frequency filter for extracting the spatial frequency component of the key information from the composite image information is designed. In this case, the key information is originally binary. This information is therefore characterized in that an edge (=boundary between a white pixel and a black pixel) has a steep gradient. As an edge in a spatial domain becomes steeper, more harmonic components are contained in a frequency domain. If, therefore, the frequency filter coefficient calculated by using image information containing many steep edges without any change is used, noise on the harmonic side passes through the filter. In this case, the S/N ratio decreases to cause a trouble in restoration of sub-information.

For this reason, the adjustment operation in (3) is required. The contents of this operation depend on each key information and the operating environment of the system. In general, harmonic components are filtered out to suppress noise, and only frequencies near the fundamental frequency are passed. Under an environment where there is little noise, there is an approach to improving the security by also passing harmonic components and intentionally using the complexity of key information.

In order to extract the spatial frequency component of the key information from the composite image information captured by the to-be-recorded image input unit 111 by using the frequency filter coefficient calculated in advance by the above method, convolution integration is performed according to equation (1):

$$K(x, y) = \sum_u \sum_v (g(u, v) \cdot I(x - u, y - v))$$

where I is the composite image information captured by the to-be-recorded image input unit 111, g is the frequency filter coefficient, and K is the extracted spatial frequency component of the key information.

Note that a method of extracting a specific spatial frequency component is not limited to the method using the above spatial frequency filter. It suffices to use a method of extracting a specific spatial frequency component by performing mapping information into another space and then inversely mapping the information by using known Fourier transform and Wavelet transform.

Reconstruction processing of reconstructing sub-information from the spatial frequency component extracted in the above manner will be described next. This reconstruction processing is performed according to the following procedures (1) to (3).

(1) A zero-crossing point (a point of sign change) is extracted from the extracted spatial frequency component.

(2) A reference phase of the spatial frequency component is obtained by projecting the zero-crossing point.

(3) The deviation of each coordinate of the spatial frequency component from the reference phase is calculated. The pixel value at each coordinate which deviates from the reference phase by a predetermined threshold or more is replaced with black, and other pixel values are placed with white.

Figure 11:
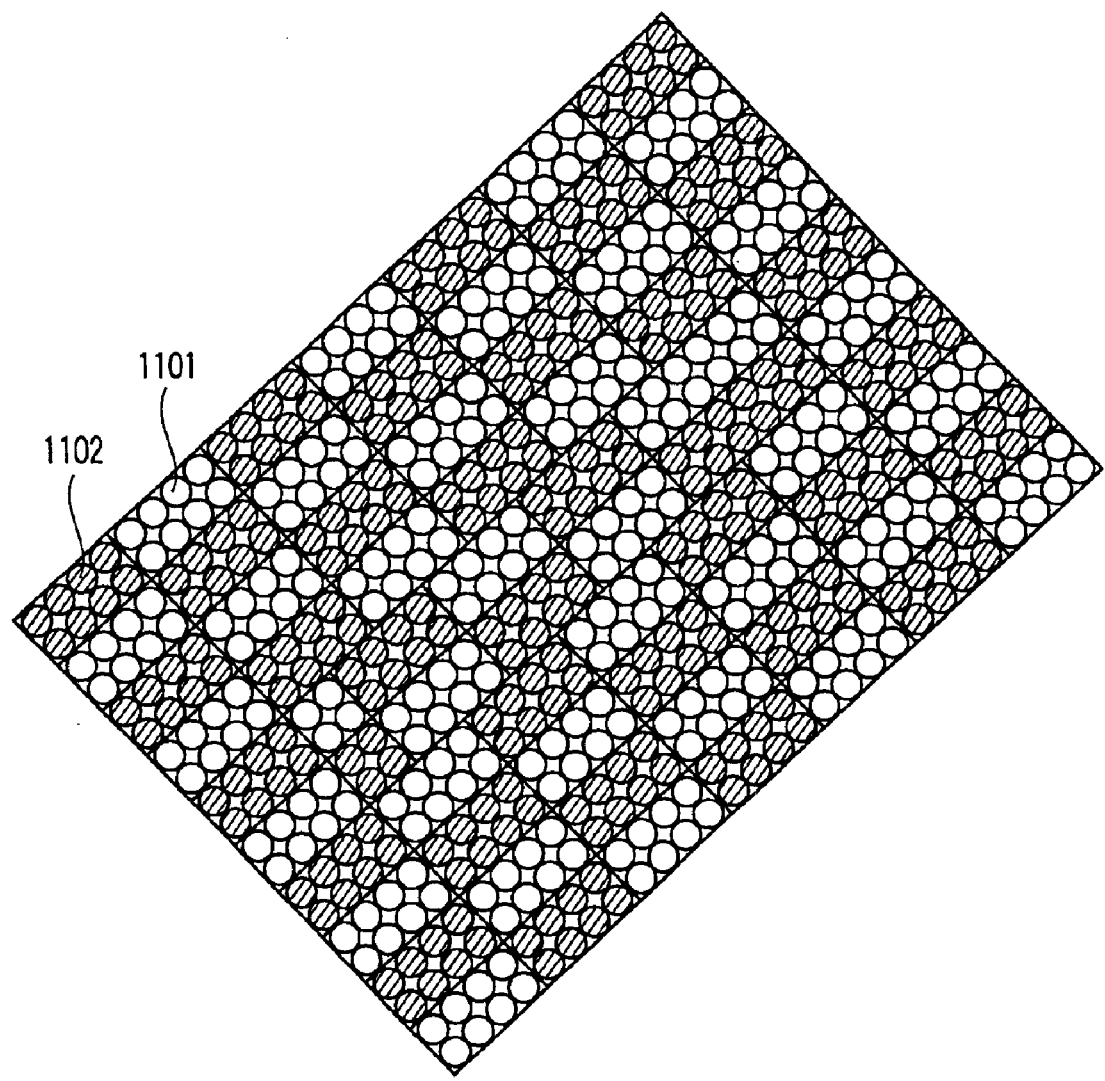
FIG. 11 is a schematic view showing a process in reconstruction processing for sub-information.
Figure 12:
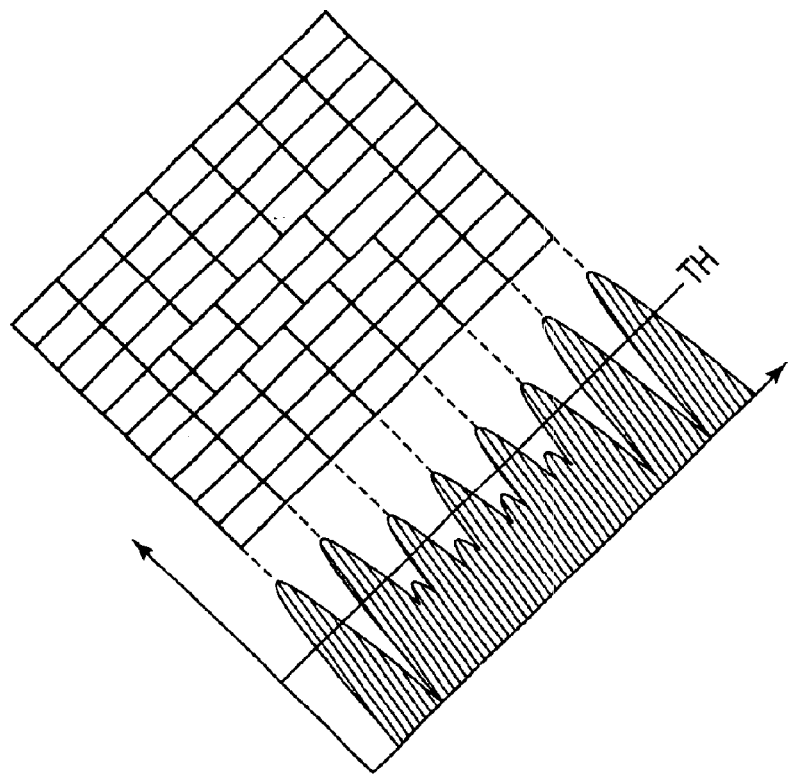
FIG. 12 is a schematic view showing a process in reconstruction processing for sub-information.
Figure 13:
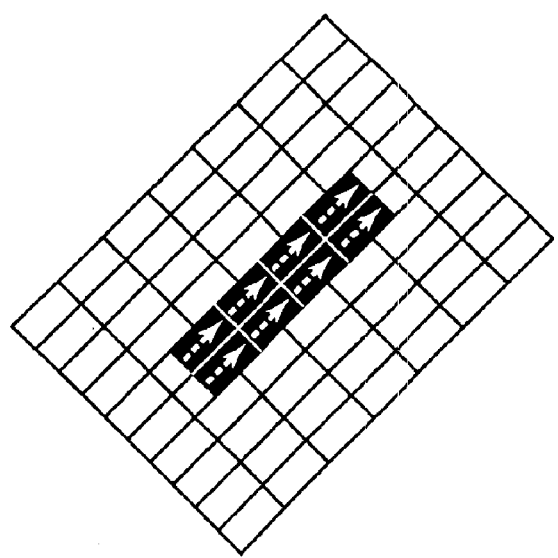
FIG. 13 is a schematic view showing a process in reconstruction processing for sub-information.

FIGS. 11 to 13 are schematic views showing the respective processes in reconstruction processing. FIG. 11 shows the amplitude of the extracted spatial frequency component of the key information. A white portion 101 indicates the + side, and a black portion 1102 indicates the − side. FIG. 12 shows the result obtained by projecting the coordinates of points (zero-crossing point s) where the signs "+" and "−" are switched and totalizing the number of points. In this case, coordinates which exhibit a number equal to or more than a predetermined threshold TH are extracted as a zero-crossing point of the reference phase. FIG. 13 shows the result obtained by calculating the deviation of the spatial frequency component at each coordinates from the reference phase and replacing the pixel value in accordance with the deviation.

With the above processing, sub-information can be restored as monochrome binary image information from composite image information.

Note that when composite image information is generated by the method disclosed in Jpn. Pat. Appln. KOKAI Publication No. 2001-268346 described above, sub-information (sub-image information) is restored according to the following procedures (1) to (3).

(1) A specific spatial frequency component Fi is extracted on the basis of predetermined key information Ki ($1 \leq i \leq N$), where N is the total number of key information Ki used to embed sub-information (sub-image information).

(2) Binarization processing is performed for the extraction result Fi with a predetermined threshold THi corresponding to the key information Ki.

(3) The above procedures (1) and (2) are executed with respect to Nd ($Nd \leq N$) pieces of key information necessary for restoration, and the resultant data are combined according to a predetermined sequence.

The method disclosed in Jpn. Pat. Appln. KOKAI Publication No. 2001-268346 is characterized in that a plurality of pieces of key information can be used to embed sub-information (sub-image information), and an arbitrary combination of pieces of key information necessary for the restoration of the sub-information (sub-image information) can be selected.

When, therefore, the sub-information (sub-image information) is restored from the composite image information generated by this method, the sequence of extracting a spatial frequency component corresponding to key information and reconstructing the sub-information (sub-image information) by binarizing information fragments is executed a predetermined number of times, and the resultant information fragments are combined.

Key information, a threshold, and a combining method which are required for restoration are determined in advance when embedding is performed. As for the Nd pieces of key information Ki, all the pieces of information (N pieces of key information) used in embedding operation may be set as necessary information, or several pieces of information (Nd ($Nd \leq N$) pieces of information) selected from all the pieces of information according to a predetermined sequence or randomly may be used.

As for the threshold THi, a value common to all the pieces of key information Ki (i=1, . . . , N) or different values for the respective pieces of key information Ki may be used. Sub-information (sub-image information) fragments may be combined by a method of concatenating the respective fragments vertically and horizontally, a method of combining the fragments by addition, exclusive ORing, and the like, or a method of using a combination of arithmetic operations such as concatenation and combining. In addition, predetermined weights may be assigned to the respective fragments before arithmetic operation.

The use of the image processing system described above can prepare a personal authentication medium in which a digital watermark is embedded, and check the mark, thereby realizing a system with higher security than the prior art.

As described above, according to the first embodiment, composite image information constituted by main image information and another additional sub-information (sub-image information) embedded in the main image information in an invisible state can be generated for analog data output to an personal authentication medium, and the digital watermark information in the composite image information can be maintained after the composite image information is recorded.

In the image recording apparatus using the fusion thermal transfer recording scheme, the digital watermarking technique can be applied to a to-be-recorded image while high gradation performance is maintained. The digital watermark information (sub-information) can be stored without being destroyed and restored after recording.

The second embodiment will be described next.

Figure 14:
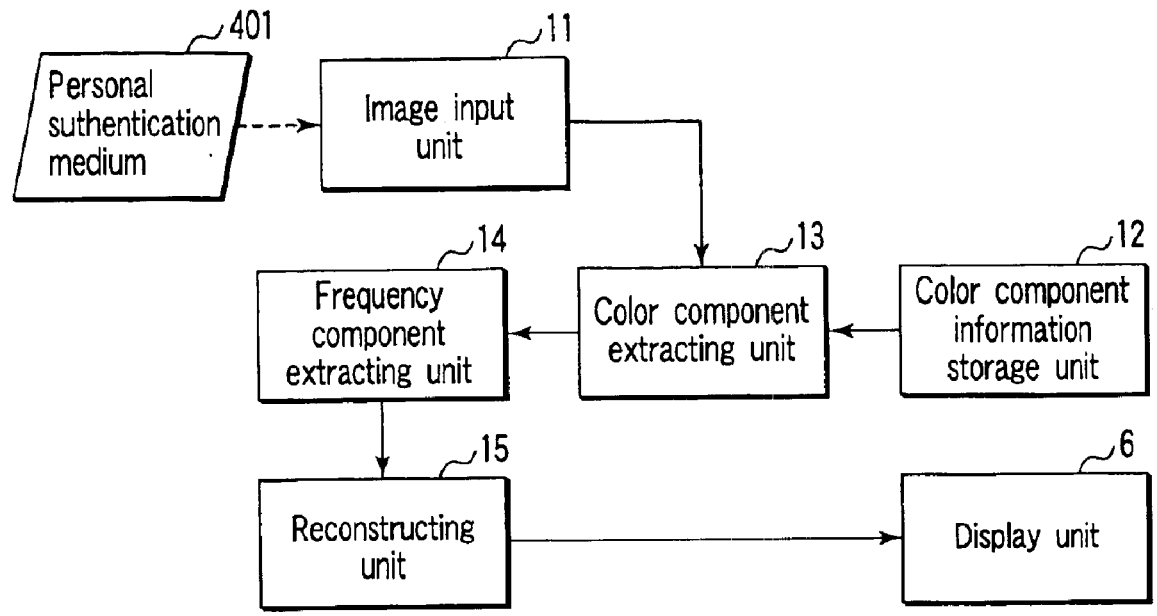
FIG. 14 is a block diagram schematically showing the arrangement of a second image processing apparatus according to the second embodiment of the present invention.

FIG. 14 shows the arrangement of a second image processing apparatus 110 according to the second embodiment. The second image processing apparatus 110 is comprised of an image input unit 11, color component information storage unit 12, color component extracting unit 13, frequency component extracting unit 14, reconstructing unit 15, and display unit 16. The function of each unit will be described in detail below.

The image input unit 11 captures, for example, composite image information 403 recorded on a personal authentication medium 401 in FIG. 4 using an image input device such as a camera, and converts it into digital composite image information. This image information has three planes, i.e., R, G, and B planes.

The color component information storage unit 12 stores the information of a color component used for the restoration of a digital watermark. The color component extracting unit 13 extracts the color component used for the restoration of the digital watermark from the image information input from the image input unit 11 on the basis of the color component information read out from the color component information storage unit 12.

The frequency component extracting unit 14 frequency-filters the color component extracted by the color component extracting unit 13 to extract the amplitude (=strength) information and phase information of the spatial frequency component of embedded key information.

The reconstructing unit 15 performs totalization processing and spatial filtering for the amplitude information and phase information of the spatial frequency component extracted by the frequency component extracting unit 14 to reconstruct a modulated component, i.e., sub-information, with respect to the key information.

The display unit 16 displays the sub-information reconstructed by the reconstructing unit 15 (or may simultaneously display the input image information and sub-information).

The color component information storage unit 12 stores in advance information about a color component exhibiting high gradation characteristics, such as information that can specify a color component exhibiting the highest gradation characteristics among the colors of inks used for printing, e.g., C, M, and Y, or the colors of optical filters used for image capturing, e.g., R, G, and B. This information may be a character string indicating a color name, a numerical value indicating the wavelength of an electromagnetic wave corresponding to the color, the number of an address assigned for management in the color component information storage unit 12, or the like.

A color component exhibiting high gradation characteristics will be described below by taking ink in a printer as an example. In general, in a printer, inks of different colors have different compositions. For this reason, inks of different colors exhibit different physical properties. Gradation characteristics depend on physical properties. As a consequence, inks of different colors differ in gradation characteristics.

Figure 15:
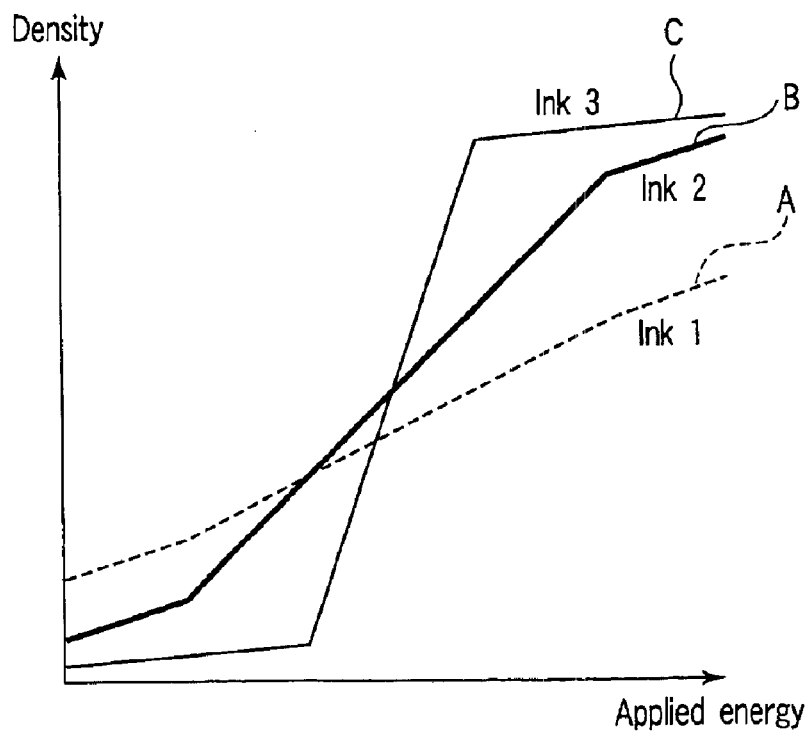
FIG. 15 is a graph for explaining the gradation characteristics of ink.

A printer like a sublimation type printer designed to change the density of ink adhering to a print target by controlling the applied energy exhibits characteristics represented by the relationship between the applied energy and the density shown in FIG. 15. In general, the density does not change much in a region where the applied energy is high and a region where the applied energy is low, and the density changes in accordance with the applied energy in an intermediate region. Gradation characteristics are determined by the controllability of the density of ink and the feasible density range. With regard to the former, better gradation characteristics appear as the gradient of a plot of applied energy versus density becomes more moderate. With regard to the latter, better gradation characteristics appear as the difference between the minimum density and the maximum density increases.

For example, FIG. 15 shows the applied energy/density characteristics of three types of ink. Referring to FIG. 15, ink 1 (characteristic A) exhibits a narrow feasible density range, and ink 3 (characteristic C) exhibits low controllability. Among these types of ink, therefore, ink 2 (characteristic B) exhibits the best gradation characteristics.

The gradation characteristics described above are not unique to the scheme exemplified above. For example, differences in physical property between inks also produce differences in gradation characteristics in a scheme like a fusion type scheme designed to change the areas of dots instead of density.

The above description has exemplified ink in a printer. Optical filters used for image capturing also differ in physical properties such as passband width and attenuation factor. For this reason, such filters also differ in gradation characteristics.

The relationship between the restoration of a digital watermark and gradation characteristics will be described next. The digital watermark embedded by color difference modulation processing can be restored through a process of color component extraction→spatial frequency component extraction→sub-information reconstruction. Since the details of the process have already been described, only its outline will be described.

In color extraction processing and spatial frequency component extraction processing, a color difference is extracted from a captured image, and the color difference is converted into corresponding information, e.g., bit on/off information, in sub-information reconstruction processing, thereby restoring the digital watermark.

Information that can be expressed by a color difference depends on gradation characteristics. That is, information that can be expressed decreases in amount as the gradation characteristics decrease, and vice versa. The gradation characteristics change for each color component when digital information is converted into analog information or conversion inverse thereto is performed. Using a color component exhibiting the highest gradation characteristics can suppress a decrease in the amount of information that can be expressed by a color difference, thereby improving the restoration characteristics of the digital watermark.

Using a color component exhibiting little deterioration at the time of digital/analog conversion makes it possible to improve the restoration characteristics of embedded sub-information.

The third embodiment will be described next.

FIG. 16 shows the arrangement of a second image processing apparatus 110 according to the third embodiment. The second image processing apparatus 110 is comprised of an image input unit 21, area extracting unit 22, color feature extracting unit 23, color combining unit 24, frequency component extracting unit 25, reconstructing unit 26, and display unit 27. The function of each unit will be described in detail below.

The image input unit 21 captures, for example, composite image information 403 recorded on a personal authentication medium 401 in FIG. 4 using an image input device such as a camera, and converts it into digital composite image information. This image information has three planes, i.e., R, G, and B planes.

The area extracting unit 22 sets an area having a predetermined size on the image information input from the image input unit 21. As the size of an area to be set, the number of pixels corresponding to the fundamental wavelength of the spatial frequency component of the key information used in embedding operation is used.

The color feature extracting unit 23 totalizes the values of pixels existing in the area set by the area extracting unit 22 with respect to each of the R, G, and B planes, and calculates the feature of each color. The color combining unit 24 calculates weights used in combining the respective planes, i.e., the R, G, and B planes, on the basis of the totalization result obtained by the color feature extracting unit 23.

The frequency component extracting unit 25 frequency-filters the color component combined by the color combining unit 24 to extract the amplitude (=strength) information and phase information of the spatial frequency component of embedded key information.

The reconstructing unit 26 performs totalization processing and spatial filtering for the amplitude information and phase information of the spatial frequency component extracted by the frequency component extracting unit 25 to reconstruct a modulated component, i.e., sub-information, with respect to the key information. The display unit 27 displays the sub-information reconstructed by the reconstructing unit 26 (or may simultaneously display the input image information and sub-information).

Figure 17:
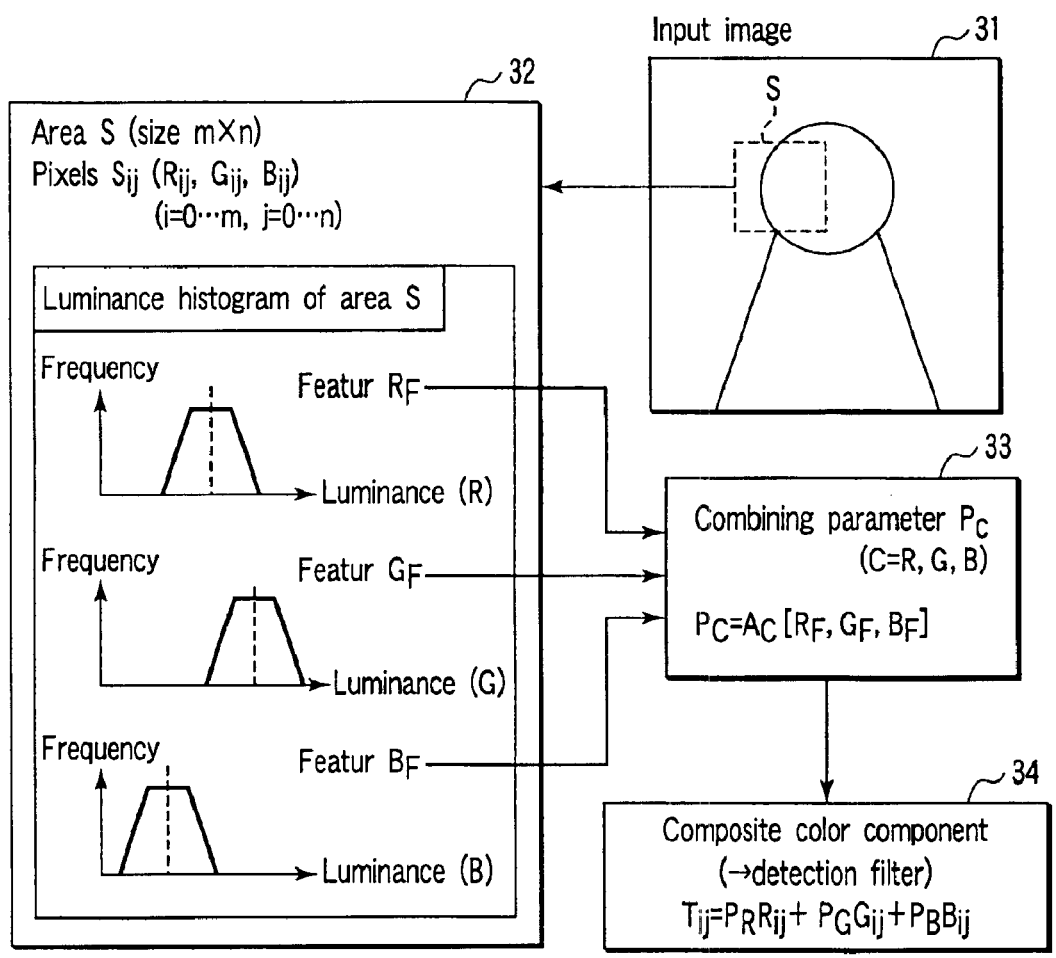
FIG. 17 is a view for explaining the flows of color feature extraction processing and color combining processing.

FIG. 17 shows an outline of the flow of processing in the area extracting unit 22, color feature extracting unit 23, and color combining unit 24. First of all, the area extracting unit 22 sets an extraction target area S for a color feature, centered on a pixel of interest, on the digital image information captured by the image input unit 21 (step S31).

In this embodiment, as the size of the area S, the number of pixels corresponding to the fundamental wavelength of the spatial frequency component of the key information used in embedding operation, i.e., a value based on the fundamental wavelength which is set in consideration of changes in resolution in recording and reading operations, is used. If, for example, the fundamental wavelength is two pixels and the record and read resolutions for a main image are 200 dpi and 400 dpi, respectively, the size of the area S becomes four pixels. Assume that the pixel of interest is sequentially moved from the left to right and from the bottom to top of the image, and the movement amount corresponds to the size of the area.

Note that the position of the first pixel of interest is calculated in advance from the placement position of the personal authentication medium at the time of image input operation and the record position of a facial image in the personal authentication medium.

The color feature in each area S is obtained by using the values of pixels in the area for each plane (step S32). A color feature is a numeral value representing a color in the area. In this embodiment, as a color feature, the average luminance values of pixels in the area for each plane is used. Letting $R_{ij}$, $G_{ij}$, and $B_{ij}$ (i=1 ... m, j=1 ... n) be pixel values in the respective planes, i.e., the R, G, and B planes, in the area S of m×n pixels, color features $R_F$, $G_F$, and $B_F$ are given by $$C_F = \sum_{i=1}^{m} \sum_{j=1}^{n} C_{ij} (C = R, G, B)$$

The color combining unit 24 determines a color combining parameter $P_C$ corresponding to the color feature in each plane (step S33), and performs color combining processing for the respective pixels in the area on the basis of the color combining parameter $P_C$ (step S34). In this embodiment, when the color combining parameter $P_C$ is determined from the color feature, a three-dimensional array in which the color combining parameter $P_C$ is stored using the color feature as an index is used.

Letting $R_{ij}$, $G_{ij}$, and $B_{ij}$ (i=1 ... m, j=1 ... n) be pixel values in the respective planes, i.e., the R, G, and B planes, in the area S of m×n pixels, and $R_F$, $G_F$, and $B_F$ be color features, color combining parameters $P_R$, $P_G$, and $P_B$ are determined as follows:

$$P_C = A_C[R_F, G_F, B_F] \ (C=R, G, B)$$

where $A_C$ (C=R, G, B) is a three-dimensional array, in which color combining parameters corresponding to the respective planes are stored. For example, $A_R$ stores the color combining parameter $P_R$ for the R plane.

Assume that the value of the color combining parameter $P_C$ (C=R, G, B) is determined in advance by the following processing (1) to (4).

(1) A color patch for determining a parameter is generated. A color patch is printed matter on which an area having a predetermined area is pained in a single color. Assume that digital watermark embedding processing has been performed for the area.

(2) The color patch is captured by the image input unit 21 or an image input unit having equivalent performance to calculate color features in the R, G, and B planes.

(3) Digital watermarks are restored from the R, G, and B planes, respectively, and the average value of the amplitudes of the restored signals is calculated. In this case, no color combining is performed.

(4) Color combining parameters corresponding to the color features calculated in (2) are determined from the values calculated in (3). If, for example, the average amplitude value of a given plane is larger than a predetermined threshold $\epsilon$, the color combining parameter of the plane is set to "1", and the remaining planes are set to "0". In contrast to this, if the average amplitude value of all the planes is smaller than the threshold $\epsilon$, the color combining parameters of all the planes are set to ⅓.

Color combining computation is performed for the respective pixels in the area by using the color combining parameters determined in the above manner. In this embodiment, as color combining computation, the linear sum obtaining by multiplying the pixel values in the respective planes by the corresponding color combining parameters as weights and adding the resultant values is used. Letting $R_{ij}$, $G_{ij}$, and $B_{ij}$ (i=1 ... m, j=1 ... n) be pixel values in the respective planes, i.e., the R, G, and B planes, in the area S of m×n pixels, and $P_R$, $P_G$, and $P_B$ be color combining parameters in the area S, a value $T_{ij}$ obtained as a result of color combining is calculated as follows:

$$T_{ij} = P_R R_{ij} + P_G G_{ij} + P_B B_{ij} (i=1 \ldots m, j=1 \ldots n,)$$

The above processing is applied to the overall input image to obtain a color composite image T. Subsequently, the frequency component extracting unit 25 extracts a specific spatial frequency component from the color composite image T on the basis of the key information used in digital watermark embedding processing. The reconstructing unit 26 reconstructs sub-information.

According to the above description, the position of the first pixel of interest is determined from the placement position of the personal authentication medium and the record position of the facial image. However, the present invention is not limited to this method. For example, a specific pattern is recorded in or near a facial image in advance, and the position of the first pixel of interest may be determined by using the result obtained by detecting the position of the pattern.

In addition, if the size of the spatial frequency component of key information is sufficiently smaller than that of a facial image, no area segmentation is performed, and a color feature may be calculated from a predetermined range centered on the pixel of interest.

In the above description, as a color feature, the average luminance of pixels in an area is used. However, the present invention is not limited to this. For example, a color feature may be a median or mode, or a value indicting a distribution shape, e.g., a value obtained by correction using a standard deviation or variance as a weight. Alternatively, a color feature may be a value obtained by applying a predetermined function or algorithm or the like.

Furthermore, according to the above description, a color combining parameter is determined from a three-dimensional array. However, the present invention is not limited to this method. For example, a color combining parameter may be determined on the basis of the following function:

$$P_C = f_C(R_F, G_F, B_F) \ (C=R, G, B)$$

where $f_C$ (C=R, G, B) represents a color computation function for determining a color combining parameter from a color feature. As the color computation function $f_C$ (C=R, G, B), for example, linear sum $P_C = W_{C1} R_F + W_{C2} G_F + W_{C3} B_F$ (C=R, G, B) obtained by multiplying $R_F$, $G_F$, and $B_F$ by predetermined weights or a polynomial having a high-order term such as $R_F^2$ or a cross term such as $R_F G_F$ may be used. Alternatively, such calculation may be done after logarithmic transformation like $R_F' = \log(R_F)$.

Moreover, according to the above description, a weighted linear sum is used for color combining computation. However, the present invention is not limited to this method. For example, color combining computation may be done by using a polynomial having a high-order term such as $R_{ij}^2$ or a cross term such as $R_{ij} G_{ij}$, or such calculation may be done after logarithmic transformation like $R_{ij}' = \log(R_{ij})$. Alternatively, $=T_{ij}[R_{ij}, G_{ij}, B_{ij}, P_R, P_G, P_B]$ may be set by using a six-dimensional array $A_T$ storing color composite values using color features and color combining parameters as indexes.

The influence of a deterioration is reduced by combining the color components of input image information in this manner, thereby improving the restoration characteristics of the embedded sub-information.

The fourth embodiment will be described next.

FIG. 18 shows the arrangement of a second image processing apparatus 110 according to the fourth embodiment. The second image processing apparatus 110 is comprised of an image input unit 41, area extracting unit 42, color feature extracting unit 43, amplification coefficient determining unit 44, frequency component extracting unit 45, extracted signal amplifying unit 46, reconstructing unit 47, and display unit 48. The function of each unit will be described in detail below.

The image input unit 41 captures, for example, composite image information 403 recorded on a personal authentication medium 401 in FIG. 4 using an image input device such as a camera, and converts it into digital composite image information. This image information is constituted by three planes, i.e., R, G, and B planes.

The area extracting unit 42 sets an area having a predetermined size on the image information input from the image input unit 41. As the size of an area to be set, the number of pixels corresponding to the fundamental wavelength of the spatial frequency component of the key information used in embedding operation is used.

The color feature extracting unit 43 totalizes the values of pixels existing in the area set by the area extracting unit 42 with respect to each of the R, G, and B planes, and calculates the feature of each color. The amplification coefficient determining unit 44 determines an amplification coefficient for the reconstruction of a restoration result on the basis of the totalization result obtained by the color feature extracting unit 43.

The frequency component extracting unit 45 frequency-filters the image information input from the image input unit 41 to extract the amplitude (=strength) information and phase information of the spatial frequency component of embedded key information.

The extracted signal amplifying unit 46 performs amplification processing for the amplitude information or phase information of the spatial frequency component extracted by the frequency component extracting unit 45 by using the amplification coefficient determined by the amplification coefficient determining unit 44.

The reconstructing unit 47 performs totalization processing and spatial filtering for the amplitude information or phase information of the spatial frequency component amplified by the extracted signal amplifying unit 46 to reconstruct a modulated component, i.e., sub-information, with respect to the key information. The display unit 48 displays the sub-information reconstructed by the reconstructing unit 47 (or may simultaneously display the input image information and sub-information).

Figure 19:
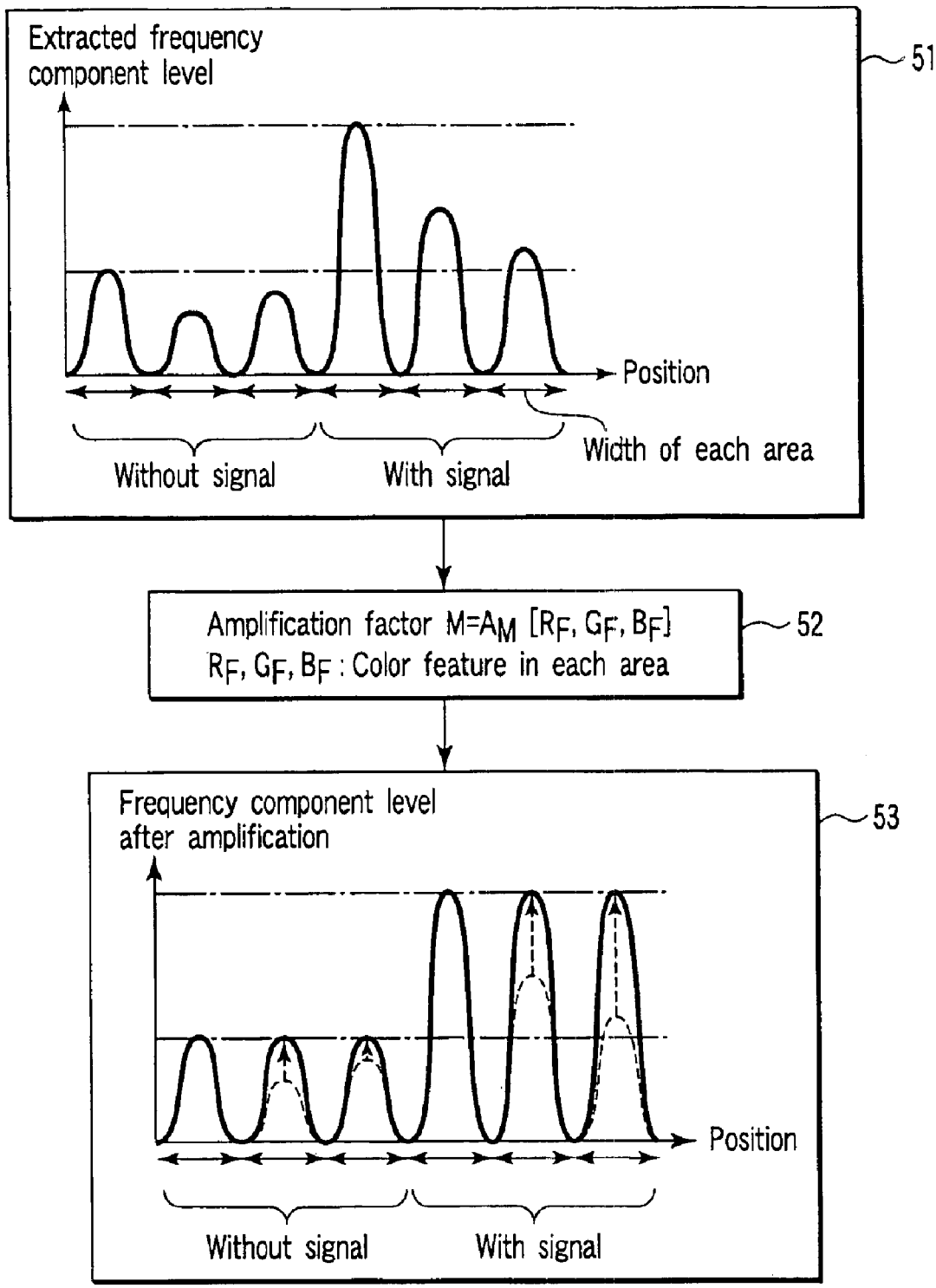
FIG. 19 is a view for explaining the flow of extracted signal amplifying processing.

FIG. 19 shows an outline of the flow of processing in the extracted signal amplifying unit 46. First of all, the color feature extracting unit 43 calculates a color feature by performing the same processing as that performed by the color feature extracting unit 23 described in the third embodiment (step S51).

The amplification coefficient determining unit 44 then determines an amplification coefficient (amplification factor) M in the area from the color feature in each plane (step S52). Letting $R_F$, $G_F$, and $B_F$ be the color features in the R, G, and B planes in an area S having m×n pixels, the amplification coefficient M is determined as follows:

$$M = A_M[R_F, G_F, B_F]$$

where $A_M$ is a three-dimensional array, in which amplification coefficients corresponding to color features are stored.

The extracted signal amplifying unit 46 multiplies the spatial frequency component extracted by the frequency component extracting unit 45 by the amplification coefficient M obtained by the amplification coefficient determining unit 44 in each area (step S53). With this processing, the extracted frequency components are corrected such that variations in maximum value in the respective areas fall within a predetermined range.

According to the above description, a three-dimensional array is used to determine the amplification coefficient M. However, the present invention is not limited to this method. For example, the amplification coefficient M may be determined on the basis of the following function:

$$M = f_M(R_F, G_F, B_F)$$

where $f_M$ represents an amplification coefficient computation function for determining an amplification coefficient from a color feature. As the amplification coefficient computation function $f_M$, for example, linear sum $M = W_{M1}R_F + W_{M2}G_F + W_{M3}B_F$ obtained by multiplying $R_F$, $G_F$, and $B_F$ by predetermined weights or a polynomial having a high-order term such as $R_F^2$ or a cross term such as $R_F G_F$ may be used. Alternatively, such calculation may be done after logarithmic transformation like $R_F' = \log(R_F)$.

As described above, the visibility of embedded sub-information can be improved by correcting reconstruction processing in accordance with the color components of input image information.

In the fourth embodiment, a multilevel image is created by multiplying an extracted spatial frequency component by an amplification coefficient. However, a binary image may be created by performing binarization processing for the areas using a three-dimensional array $A_B$ storing binarization thresholds corresponding to color features in the respective areas. According to this method, the data amount of a restoration result can be reduced, and the contrast of the restoration result can be improved.

As has been described above, according to the second to fourth embodiments, since a color component exhibiting little deterioration at the time of digital/analog conversion is used, when composite image information constituted by main image information and another additional sub-information (sub-image information) embedded in the main image information in an invisible state is generated for analog data output to printed matter, the performance of restoring the embedded sub-information from the printed composite image information can be improved without increasing the risk of disclosing the sub-information from the composite image information.

In addition, reducing the influence of a deterioration by combining color components of input image information makes it possible to improve the performance of restoring embedded sub-information from printed composite image information without increasing a similar risk.

In addition, correcting reconstruction processing in accordance with color components of input image information makes it possible to improve the visibility of sub-information restored from printed composite image information without increasing a similar risk.

As described above, according to each embodiment of the present invention, there are provided an image processing system and image processing method and apparatus which can create composite image information constituted by main image information and another additional sub-information embedded in the main image information in an invisible state for analog data output to a recording medium, and maintain the digital watermark information in the composite image information after the composite image information is recorded.

According to each embodiment of the present invention, there are provided an image processing system and image processing method and apparatus which can apply a digital watermarking technique to a to-be-recorded image while maintaining high gradation performance in the fusion thermal transfer recording scheme, and allow the watermark information (sub-information) to be stored and restored without destruction after it is recorded.

In addition, according to each embodiment of the present invention, there are provided an image processing system and image processing method and apparatus which can restore a digital watermark which is resistant to a deterioration in image information.

Furthermore, according to each embodiment of the present invention, there are provided an image processing method and apparatus which can improve restoration characteristics and visibility of embedded sub-information without increasing the risk of disclosing the sub-information.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image processing system comprising a first image processing apparatus which records, on a recording medium, composite image information created by embedding invisible sub-information in visible main image information, and a second image processing apparatus which restores the sub-information from the composite image information recorded on the recording medium by the first image processing apparatus, the first image processing apparatus including a pre-processing unit which performs, for main image information, pre-processing corresponding to pixel formation processing for image recording in the first image processing apparatus, an embedding processing unit which creates composite image information by embedding sub-information in main image information in an invisible state using the main image information, the sub-information, and key information used to restore the sub-information, and a recording unit which records the composite image information created by the embedding processing unit on a recording medium, and the second image processing apparatus including an image input unit which inputs the composite image information from the recording medium on which the composite image information is recorded by the recording unit of the first image processing apparatus, a frequency component extracting unit which extracts a spatial frequency component unique to the key information from the composite image information input by the image input unit, and a reconstructing unit which reconstructs the sub-information from the spatial frequency component extracted by the frequency component extracting unit.

2. An image processing system comprising a first image processing apparatus which records, on a recording medium, composite image information created by embedding invisible sub-information in visible main image information, and a second image processing apparatus which restores the sub-information from the composite image information recorded on the recording medium by the first image processing apparatus, the first image processing apparatus including a first pre-processing unit which performs, for main image information, first pre-processing corresponding to pixel formation processing for image recording in the first image processing apparatus, a second pre-processing unit which performs geometric transformation with respect to the main image information having undergone the first pre-processing by the first pre-processing unit, an embedding processing unit which creates composite image information by embedding sub-information in main image information in an invisible state using the main image information, the sub-information, and key information used to restore the sub-information, an inverse transformation unit which performs transformation processing inverse to the transformation processing by the second pre-processing unit with respect to the composite image information created by the embedding processing unit, and a recording unit which records the composite image information having undergone the inverse transformation processing by the inverse transformation unit by an alternate driving/recording scheme of alternately forming even-numbered and odd-numbered pixels in a main scanning direction of a recording device on a recording line basis, and the second image processing apparatus including an image input unit which inputs the composite image information from the recording medium on which the composite image information is recorded by the recording unit of the first image processing apparatus, a frequency component extracting unit which extracts a spatial frequency component unique to the key information from the composite image information input by the image input unit, and a reconstructing unit which reconstructs the sub-information from the spatial frequency component extracted by the frequency component extracting unit.

3. A system according to claim 2, wherein the first pre-processing unit thins out main image information in accordance with pixel formation processing for image recording in the first image processing apparatus.

4. A system according to clam 3, wherein the second pre-processing unit rotates the main image information, which is thinned out by the first pre-processing unit in advance, through a predetermined angle, and then performs geometric transformation to remove thinned-out portions from the main image information, compresses effective portions of the main image information, and performs reconstruction.

5. A system according to claim 2, wherein the frequency component extracting unit extracts a spatial frequency component of the key information from the composite image information input by the image input unit by using a frequency filter coefficient.

6. A system according to claim 2, wherein the reconstructing unit extracts a change point at which a sign changes from the spatial frequency component extracted by the frequency component extracting unit, obtains a reference phase of the spatial frequency component by projecting the extracted change point, calculates a deviation of each coordinates of the spatial frequency component extracted by the frequency component extracting unit from the obtained reference phase, and replaces a pixel value of a coordinate which deviates by not less than a predetermined threshold with a first value, and each of other pixel values with a second value, thereby reconstructing sub-information.

7. A system according to claim 2, further comprising a determining unit which determines authenticity of the recording medium on the basis of the sub-information reconstructed by the reconstructing unit.

8. An image processing apparatus comprising:

an image input unit which inputs composite image information from a recording medium on which the composite image information is recorded, which is created by color difference modulation processing using visible main image information, sub-information embedded in the main image information in an invisible state, and key information used to restore the sub-information;

a frequency component extracting unit which extracts a spatial frequency component unique to the key information from the composite image information input by the image input unit; and a reconstructing unit which reconstructs the sub-information from the spatial frequency component extracted by the frequency component extracting unit.

9. An apparatus according to claim 8, wherein the frequency component extracting unit extracts a spatial frequency component of the key information from the composite image information input by the image input unit by using a frequency filter coefficient.

10. An apparatus according to claim 8, wherein the reconstructing unit extracts a change point at which a sign changes from the spatial frequency component extracted by the frequency component extracting unit, obtains a reference phase of the spatial frequency component by projecting the extracted change point, calculates a deviation of each coordinates of the spatial frequency component extracted by the frequency component extracting unit from the obtained reference phase, and replaces a pixel value of a coordinate which deviates by not less than a predetermined threshold with a first value, and each of other pixel values with a second value, thereby reconstructing sub-information.

11. An apparatus according to claim 8, further comprising a determining unit which determines authenticity of the recording medium on the basis of the sub-information reconstructed by the reconstructing unit.

12. An image processing apparatus comprising:

an image input unit which inputs composite image information from a recording medium on which the composite image information is recorded, which is created by color difference modulation processing using visible main image information, sub-information embedded in the main image information in an invisible state, and key information used to restore the sub-information;

a color component information storage unit which stores color component information;

a color component extracting unit which extracts a color component from the composite image information input by the image input unit on the basis of the color component information stored in the color component information storage unit;

a frequency component extracting unit which extracts a spatial frequency component unique to the key information from the color component extracted by the color component extracting unit; and a reconstructing unit which reconstructs the sub-information from the spatial frequency component extracted by the frequency component extracting unit.

13. An apparatus according to claim 12, wherein the color component extracted from the composite image information is a color component corresponding to a color of ink exhibiting a highest gradation characteristic when the composite image information is recorded, and information of the color component is stored in the color component information storage unit.

14. An apparatus according to claim 12, wherein the color component extracted from the composite image information is a color component corresponding to a color of ink exhibiting a highest gradation characteristic when the composite image information is input, and information of the color component is stored in the color component information storage unit.

15. An image processing apparatus comprising:

an image input unit which inputs composite image information from a recording medium on which the composite image information is recorded, which is created by color difference modulation processing using visible main image information, sub-information embedded in the main image information in an invisible state, and key information used to restore the sub-information;

an area extracting unit which extracts a local area from the composite image information input by the image input unit;

a color feature extracting unit which extracts a color feature in the local area extracted by the area extracting unit from the local area;

a color combining unit which creates color component composite image information by combining color components on the basis of the color feature extracted by the color feature extracting unit;

a frequency component extracting unit which extracts a spatial frequency component unique to the key information from the color component composite image information created by the color combining unit; and a reconstructing unit which reconstructs the sub-information from the spatial frequency component extracted by the frequency component extracting unit.

16. An image processing apparatus comprising:

an image input unit which inputs composite image information from a recording medium on which the composite image information is recorded, which is created by color difference modulation processing using visible main image information, sub-information embedded in the main image information in an invisible state, and key information used to restore the sub-information;

an area extracting unit which extracts a local area from the composite image information input by the image input unit;

a color feature extracting unit which extracts a color feature in the local area extracted by the area extracting unit from the local area;

a reconstruction parameter determining unit which determines a reconstruction parameter on the basis of the color feature extracted by the color feature extracting unit;

a frequency component extracting unit which extracts a spatial frequency component unique to the key information from the composite image information input by the image input unit; and a reconstructing unit which reconstructs the sub-information from the spatial frequency component extracted by the frequency component extracting unit by using the reconstruction parameter determined by the reconstruction parameter determining unit.

17. An apparatus according to claim 16, wherein the reconstruction parameter comprises an amplification coefficient for amplifying the spatial frequency component, and the reconstructing unit includes an amplifying unit which amplifies the spatial frequency component by using the amplification coefficient.

18. An apparatus according to claim 16, wherein the reconstruction parameter comprises a threshold for binarizing the spatial frequency component, and the reconstructing unit includes a binarizing unit which binarizes the spatial frequency component by using the threshold.

19. An image processing method comprising:
   inputting composite image information from a recording medium on which the composite image information is recorded, which is created by color difference modulation processing using visible main image information, sub-information embedded in the main image information in an invisible state, and key information used to restore the sub-information;
   extracting a spatial frequency component unique to the key information from the composite image information input from the recording medium; and
   reconstructing the sub-information from the spatial frequency component extracted by extracting the frequency component.

20. A method according to claim 19, wherein extracting the frequency component includes extracting a spatial frequency component of the key information from the composite image information input from the recording medium by using a frequency filter coefficient.

21. A method according to claim 19, wherein reconstructing includes extracting a change point at which a sign changes from the spatial frequency component, obtaining a reference phase of the spatial frequency component by projecting the extracted change point, calculating a deviation of each coordinate of the spatial frequency component from the reference phase, and replacing a pixel value of a coordinate which deviates by not less than a predetermined threshold with a first value, and each of other pixel values with a second value, thereby reconstructing sub-information.

22. A method according to claim 19, further comprising determining authenticity of the recording medium on the basis of the reconstructed sub-information.

23. An image processing method comprising:
   inputting composite image information from a recording medium on which the composite image information is recorded, which is created by color difference modulation processing using visible main image information, sub-information embedded in the main image information in an invisible state, and key information used to restore the sub-information;
   extracting a color component from the composite image information input from the recording medium on the basis of the color component information stored in a color component information storage unit;
   extracting a spatial frequency component unique to the key information from the extracted color component; and
   reconstructing the sub-information from the extracted spatial frequency component.

24. An image processing method comprising:
   inputting composite image information from a recording medium on which the composite image information is recorded, which is created by color difference modulation processing using visible main image information, sub-information embedded in the main image information in an invisible state, and key information used to restore the sub-information;
   extracting a local area from the composite image information input from the recording medium;
   extracting a color feature in a local area extracted the composite image information from the local area;
   creating color component composite image information by combining color components on the basis of the color feature extracted from the local area;
   extracting a spatial frequency component unique to the key information from the created color component composite image information; and
   reconstructing the sub-information from the extracted spatial frequency component.

25. An image processing method comprising:
   inputting composite image information from a recording medium on which the composite image information is recorded, which is created by color difference modulation processing using visible main image information, sub-information embedded in the main image information in an invisible state, and key information used to restore the sub-information;
   extracting a local area from the composite image information input from the recording medium;
   extracting a color feature in the extracted local area from the local area;
   determining a reconstruction parameter on the basis of the color feature extracted from the local area;
   extracting a spatial frequency component unique to the key information from the composite image information input from the recording medium; and
   reconstructing the sub-information from the spatial frequency component extracted by extracting the frequency component by using the reconstruction parameter determined on the basis of the color feature.

* * * * *